(12) United States Patent
Grisenthwaite et al.

(10) Patent No.: US 11,762,566 B2
(45) Date of Patent: *Sep. 19, 2023

(54) PROGRAMMABLE MAPPING OF GUARD TAG STORAGE LOCATIONS

(71) Applicant: Arm Limited, Cambridge (GB)

(72) Inventors: Richard Roy Grisenthwaite, Cambridge (GB); Graeme Peter Barnes, Cambridge (GB)

(73) Assignee: Arm Limited, Cambridge (GB)

( * ) Notice: Subject to any disclaimer, the term of this patent is extended or adjusted under 35 U.S.C. 154(b) by 87 days.

This patent is subject to a terminal disclaimer.

(21) Appl. No.: 17/370,291

(22) Filed: Jul. 8, 2021

(65) Prior Publication Data

US 2021/0334019 A1    Oct. 28, 2021

Related U.S. Application Data

(63) Continuation-in-part of application No. 16/647,729, filed as application No. PCT/GB2018/053577 on Dec. 10, 2018, now Pat. No. 11,327,903.

(30) Foreign Application Priority Data

Jan. 22, 2018 (GB) ..................................... 1800970

(51) Int. Cl.
*G06F 3/06* (2006.01)

(52) U.S. Cl.
CPC .......... *G06F 3/0622* (2013.01); *G06F 3/0655* (2013.01); *G06F 3/0673* (2013.01)

(58) Field of Classification Search
CPC .... G06F 3/0622; G06F 3/0655; G06F 3/0673; G06F 9/455; G06F 8/30
See application file for complete search history.

(56) References Cited

U.S. PATENT DOCUMENTS

| 4,903,196 A | 2/1990 | Pomerene |
| 5,452,427 A | 9/1995 | Tobita |
| (Continued) | | |

FOREIGN PATENT DOCUMENTS

| CN | 101533371 | 9/2009 |
| CN | 107015922 | 8/2017 |
| (Continued) | | |

OTHER PUBLICATIONS

Office Action for IL Application No. 275309 dated Dec. 20, 2021, 3 pages.

(Continued)

*Primary Examiner* — Zhuo H Li
(74) *Attorney, Agent, or Firm* — NIXON & VANDERHYE P.C.

(57) ABSTRACT

An apparatus comprises processing circuitry to perform data processing in response to instructions, and memory access circuitry to perform a tag-guarded memory access operation in response to a target address. The tag-guarded memory access operation comprises comparing an address tag associated with the target address with a guard tag stored in a memory system in association with a block of one or more memory locations comprising an addressed location identified by the target address, and generating an indication of whether a match is detected between the guard tag and the address tag. The memory access circuitry determines, according to a programmable mapping, a mapping of guard tag storage locations for storing guard tags for corresponding blocks of memory locations.

18 Claims, 16 Drawing Sheets

(56) References Cited

U.S. PATENT DOCUMENTS

| | | | |
|---|---|---|---|
| 5,761,464 | A | 6/1998 | Hopkins |
| 6,756,921 | B2 | 6/2004 | Kimura |
| 7,502,890 | B2 | 3/2009 | Kailas |
| 7,581,089 | B1 * | 8/2009 | White .................. G06F 9/4486 712/242 |
| 7,796,137 | B1 | 9/2010 | Mrazek et al. |
| 11,138,128 | B2 * | 10/2021 | Barnes ................ G06F 12/1009 |
| 11,327,903 | B2 * | 5/2022 | Barnes ................ G06F 9/30145 |
| 2002/0124148 | A1 | 9/2002 | Beukema et al. |
| 2007/0283115 | A1 * | 12/2007 | Freeman ............ G06F 21/6227 711/163 |
| 2013/0080698 | A1 | 3/2013 | Raghunathan |
| 2015/0227365 | A1 | 8/2015 | Sudhakar |
| 2017/0083255 | A1 | 3/2017 | Chiricescu et al. |
| 2017/0168963 | A1 | 6/2017 | Jaeger |
| 2017/0371793 | A1 | 12/2017 | Saidi et al. |
| 2018/0004525 | A1 * | 1/2018 | Baghsorkhi ......... G06F 9/30047 |

FOREIGN PATENT DOCUMENTS

| | | |
|---|---|---|
| JP | H05-134930 | 6/1993 |
| JP | 2001-5726 | 1/2001 |
| JP | 2004-157751 | 6/2004 |
| KR | 10-1232343 | 2/2013 |
| TW | 201329710 | 7/2013 |

OTHER PUBLICATIONS

Office Action for TW Application No. 107146882 dated Oct. 21, 2022 and English translation, 15 pages.
Notice of Allowance dated Jan. 21, 2022 for U.S. Appl. No. 16/647,729, 11 pages.
U.S. Appl. No. 16/647,729, filed Mar. 16, 2020, Barnes.
Office Action dated Apr. 23, 2021 for U.S. Appl. No. 16/647,729, 22 pages.
Robert Bedichek, "Some Efficient Architecture Simulation Techniques", Proceedings of the Winter 1990 USENIX Conference, Jan. 22-26, 1990, 12 pages.
Richard H. Gumpertz, "Error Detection with Memory Tags", Computer Science Department, Carnegie-Mellon University, Dec. 1981, 119 pages.
Combined Search and Examination Report for GB Application No. 1800970.4 dated Jul. 27, 2018, 7 pages.
International Search Report and Written Opinion of the ISA for PCT/GB2018/053577 dated Mar. 20, 2019, 12 pages.
Arm Limited, Extract of "Arm® Architecture Reference Manual—Armv8, for Armv8-A architecture profile" Jul. 17, 2020, 13 pages.
Arm, "Armv8.5—A Memory Tagging Extension" White Paper, 2019, 9 pages.
Office Action for IN Application No. 202047032853 dated May 20, 2022, 9 pages.
Office Action for JP Application No. 2020-536882 dated Jan. 20, 2023 and English translation, 4 pages.
Notice of Registration for CN Application No. 201880079443.0 dated Jun. 2, 2023 and English translation, 8 pages.

* cited by examiner

PROGRAMMABLE MAPPING OF GUARD TAG STORAGE LOCATIONS

This application is a continuation-in-part of U.S. patent application Ser. No. 16/647,729, filed Mar. 16, 2020, which is the U.S. national phase of International Application No. PCT/GB2018/053577 filed Dec. 10, 2018 which designated the U.S. and claims priority to GB Application No. 1800970.4 filed Jan. 22, 2018, the entire contents of each of which are hereby incorporated by reference.

The present technique relates to the field of data processing.

Software to be executed by a data processing apparatus may typically be written in a high-level programing language and then compiled into code according to the instruction set architecture supported by the apparatus on which the software is to be executed. For example, the software may originally be written in a higher level language such as Java, C or C++, and then compiled into a natively supported instruction set architecture such as x86 or Arm®.

Some higher level programing languages, such as Java, are considered memory-safe languages because they include run time error detection checks for checking for certain errors relating to memory accesses. In contrast, memory-unsafe languages, such as C and C++, do not include such run time error checks. The enduring prevalence of use of memory-unsafe languages means that in compiled code according to a given instruction set architecture, there may be a large number of memory related errors which may be vulnerable to exploitation by an attacker or other malicious party. Such errors may include:

Bounds violations, in which an array index supplied by the code is outside the legitimate bounds of the array;
Use-after-free errors, in which an access to a memory location is made after that memory location has already be deallocated or freed;
Use-after-return, in which a memory access to an address associated with a variable used within a function (such as a value on a stack) is made after already returning from the function;
Use-out-of-scope errors, in which variables are accessed outside of the scope in which they are declared; and
Use-before-initialisation errors, in which a memory address associated with a variable is accessed before the variable has been initialised.

These are just some examples of memory-related errors which can result in unpredictable behaviour and potentially provide avenues for attackers to exploit. Hence, it may be desirable to provide architectural support, within the instruction set architecture supported by a given processing apparatus, for assisting with runtime detection of certain classes of memory errors.

At least some examples provide an apparatus comprising:
processing circuitry to perform data processing in response to instructions; and
memory access circuitry to perform a tag-guarded memory access operation in response to a target address, the tag-guarded memory access operation comprising:
comparing an address tag associated with the target address with a guard tag stored in a memory system in association with a block of one or more memory locations comprising an addressed location identified by the target address; and
generating an indication of whether a match is detected between the guard tag and the address tag; in which:
the memory access circuitry is configured to determine, according to a programmable mapping, a mapping of guard tag storage locations for storing guard tags for corresponding blocks of memory locations.

At least some examples provide a method comprising:
performing a tag-guarded memory access operation in response to a target address, the tag-guarded memory access operation comprising:
comparing an address tag associated with the target address with a guard tag stored in a memory system in association with a block of one or more memory locations comprising an addressed location identified by the target address; and
generating an indication of whether a match is detected between the guard tag and the address tag; and
determining, according to a programmable mapping, a mapping of guard tag storage locations for storing guard tags for corresponding blocks of memory locations.

At least some examples provide a computer program for controlling a host data processing apparatus to provide an instruction execution environment for execution of instructions of target program code, comprising:
processing program logic to perform data processing in response to the instructions of the target program code; and
memory access program logic to perform a tag-guarded memory access operation in response to a target address, the tag-guarded memory access operation comprising:
comparing an address tag associated with the target address with a guard tag stored in a memory system in association with a block of one or more memory locations comprising an addressed location identified by the target address; and
generating an indication of whether a match is detected between the guard tag and the address tag; in which:
the memory access program logic is configured to determine, according to a programmable mapping, a mapping of guard tag storage locations for storing guard tags for corresponding blocks of memory locations.

A storage medium may store the computer program described above. The storage medium may be a non-transitory storage medium.

Further aspects, features and advantages of the present technique will be apparent from the following description of examples, which is to be read in conjunction with the accompanying drawings, in which:

FIG. 1 schematically illustrates an example of a data processing apparatus;

Figure 1:
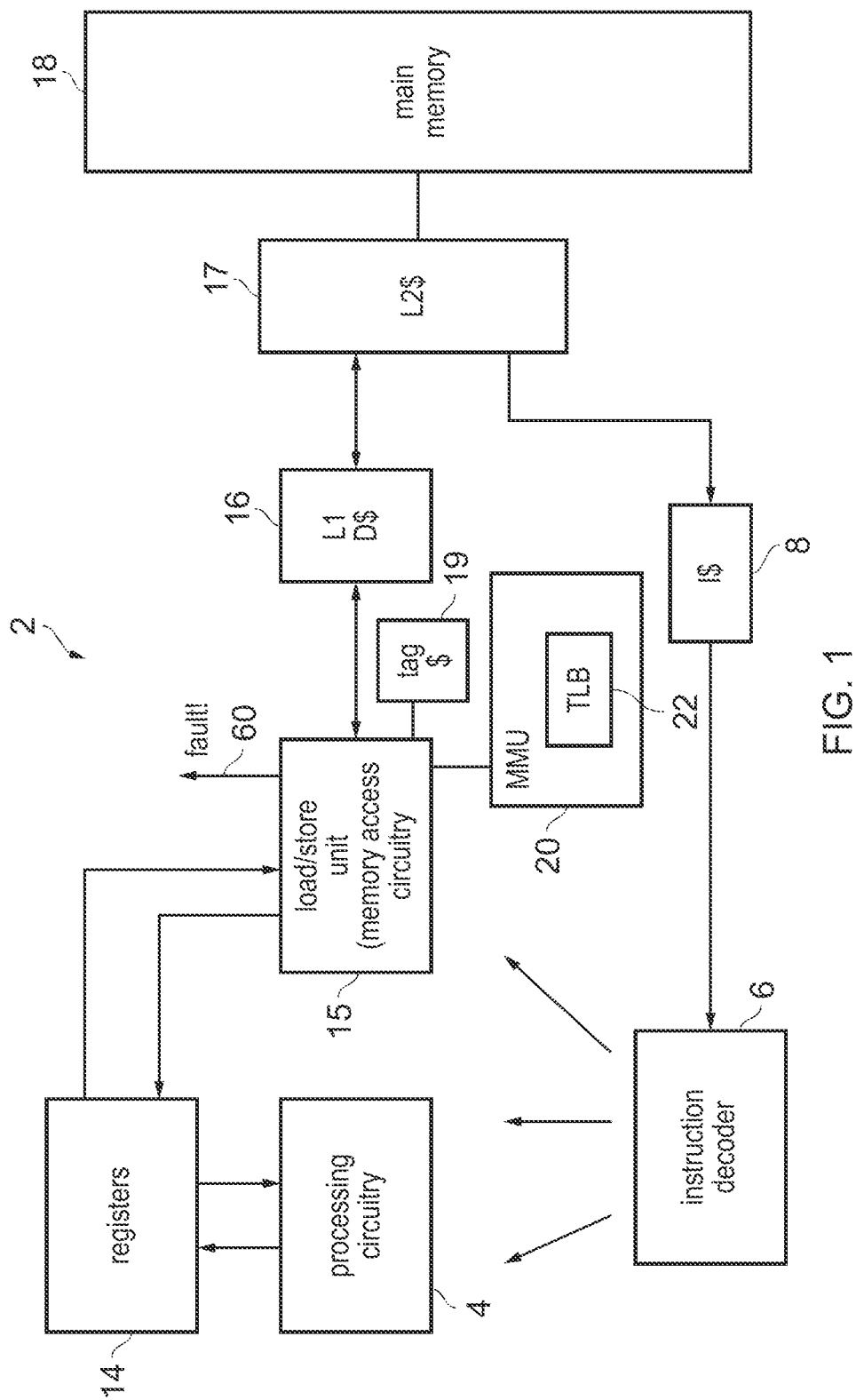

One approach for protecting against certain memory usage errors of the type discussed above may be to provide guard tags which are stored in a memory system in association with blocks of one or more memory locations. When a tag-guarded memory access operation is requested based on a target address identifying a particular addressed location in the memory system, memory access circuitry may compare an address tag that is associated with the target address with a guard tag that is stored in the memory system in associated with a block of one or more memory locations which includes the addressed location identified by the target address. The memory access circuitry may generate an indication of whether a match is detected between the guard tag and the address tag. This indication can be used to control whether the memory access is allowed to succeed or whether subsequent operations can succeed, or could merely be reported while allowing memory accesses to continue as normal.

This can be useful as, for example, a compiler compiling code based on a memory-unsafe language such as C or C++ can, when initialising regions of memory, set the guard tags of blocks of memory which the code is expected to access to particular values, and may associate the corresponding address tag values with the target addresses pointing to those blocks. If a memory usage error occurs, and for example the address pointer is used out of scope or extends out of the bounds of the valid range which was initialised, then it may be likely that the guard tag associated with the addressed location may not match the address tag associated with the target address, and then in this case the indication of whether a match is detected can be used to trigger some error handling response or error reporting mechanism. The particular response taken can depend on the particular needs of the software being executed or on the particular micro-architectural implementation of the architecture. Hence, even if the high level language does not have means for performing run time error checks in order to guard against memory access errors, the ISA used for the compiled code may include architectural features for performing such checks.

However, use of such guard tags may incur some overhead in setting the guard tags that are associated with particular blocks of memory. The process for setting the guard tags associated with blocks of memory locations may need to be relatively fast as any delay associated with setting the guard tags may also delay subsequent processing of the real software functionality being performed. The apparatus discussed below has an instruction decoder to decode a multiple guard tag setting instruction to control the memory access control circuitry to trigger at least one memory access to update the guard tags associated with at least two consecutive blocks of one or more memory locations. It may be relatively common for the guard tags associated with a range of consecutive blocks of memory locations to be set to the same tag value, e.g. on initialising regions of memory. By providing a multiple guard tag setting instruction which can, in response to a single instruction, trigger one or more memory accesses required to update the guard tags associated with an entire range of memory blocks, this can speed up setting of the tags and hence improve performance. Also, this instruction helps to reduce code density since a tighter loop with fewer instructions can control the setting of the tags for a given region of memory, requiring less space for storing instructions in memory and in any caches.

The particular form of the generated indication of whether a match is detected between the guard tag and the address tag may vary from implementation to implementation. In some cases, the tag-guarded memory access operation may comprise controlling whether a memory access to the addressed location is allowed depending on whether the match is detected between the guard tag and the address tag. However, in other examples the tag-guarded memory access may comprise performing a memory access to the addressed location irrespective of whether a match is detected between the guard tag and the address tag. For example, the guard tag associated with a given block of memory locations may be stored in a different block of memory locations within the memory system and so accessing the guard tag may require a separate read operation. Therefore, it may delay processing of the actual memory access if the memory access is delayed until the guard tag and the address tag have been compared, so it may be desired to perform the memory access to the addressed location before the guard tag is available, and regardless of whether any match is detected between the guard tag and the address tag, and then to generate a separate indication of whether a match is detected once the guard tag has been obtained and compared with the address tag.

In one example the indication of whether a match is detected may be a signal representing a fault condition, which is generated when a mismatch is detected between the guard tag and the address tag. For example, the memory access circuitry may signal a similar memory fault to faults generated if access permissions are violated or unmapped addresses are accessed, or a different kind of fault condition could be indicated. The fault signal could trigger the processing circuitry to execute an exception handling routine for responding to the detected fault.

Alternatively, status indication may be recorded within a control register accessible to the processing circuitry of the apparatus, to indicate whether a match or mismatch was detected in the comparison of the guard tag and the address tag. The status information could then be read by subsequent instructions to check whether the memory access was valid.

Another option for reporting whether the address tag and guard tag matched or mismatched can be to record information in an error log associated with the executed piece of code, which tracks any guard tag errors detected throughout the piece of code. For example, in response to a mismatching guard tag and address tag, the target address which triggered the mismatch, or the instruction address of the instruction which triggered the mismatching memory access, could be recorded in the error log. In this case, rather than performing any specific action to impede the operation of the code, the errors could simply be recorded in the error log. The error log could then be made available to a software provider of the code to assist the provider with eliminating errors in subsequent versions of the software.

Hence, it will be appreciated that there are a range of ways in which the guard tag match/mismatch indication could be generated by the memory access circuitry.

In some embodiments, the blocks of memory locations which have corresponding guard tags may each comprise a single memory location. In this case, each individual memory location may have a different guard tag, which can provide fine granularity of setting the guard tags so that a greater range of memory errors can be detected.

However, in practise the overhead of setting individual guard tags for each addressed location may be too high, and it can be more efficient to associate each guard tag with a block of multiple memory locations. In this case several adjacent memory locations may share the same guard tag, which can be enough for detecting common forms of memory-related error.

The guard tag which is associated with a given block of memory locations can be stored at any other memory location within the memory system. The particular way in which the location of the guard tags in the memory system is selected may vary significantly from implementation to implementation or at run time. In some examples, the location storing the guard tags could be architecturally accessible by the processing circuitry, i.e. the guard tag storage location may be a location mapped to part of the same address space as the addressed location. In this case, the mapping between the addressed location itself and the address of the corresponding tag storage location could be fixed or hardwired, or could be variable, e.g. tracked in a tracking table maintained by the memory access circuitry or in a translation lookaside buffer. Alternatively, other implementations may store the guard tag associated with a given addressed location in a further storage location which is not architecturally accessible to the processing circuitry, e.g. in additional storage provided in the micro-architecture which is not mapped to the address space which can be addressed by instructions executed by the processing circuitry. In this case, the memory access circuitry may determine, based on the address of the addressed location, the particular internal address used to refer to the corresponding tag storage location, and trigger any additional memory access needed to read the tag data from the tag storage location. Regardless of whether or not the tag storage location is architecturally accessible to the processing circuitry, tag values could also be cached within a cache for faster access, either within the same cache used for data values, or in a dedicated tag cache.

In some cases, the guard tags may be relatively small, for example 4 or 8 bits, and so multiple guard tags each associated with a different block of memory locations may fit within the same memory location. Hence, while multiple guard tags may be updated in response to the multiple guard tag setting instruction, in some cases the multiple guard tags may be updated in a single memory access if they are all stored within a single location which can be written to by a single write operation by the memory access circuitry. Alternatively, other implementations may need to trigger multiple independent writes to set different subsets of the guard tags to be set in response to the multiple guard tag setting instruction. Therefore, it is possible that the instruction could trigger either a single memory access or multiple memory accesses for setting the guard tags.

The address tag can be associated with the target address in different ways. In some cases the address tag could be specified separately from the target address, e.g. using a separate register specified by the tag-guarded memory access instruction which triggers the tag-guarded memory access operation. However, in other examples the address tag may be determined as a function of one or more selected bits of the target address. That is, the address tag may comprise information derived from a portion of the target address itself. Often, while an instruction set architecture may support addresses with a certain number of bits (e.g. 64 bits), a given hardware device may not in practice need so much memory capacity that it would use all the possible addresses which can be represented using that number of bits. For example, with current trends in device usage there is not yet any need to provide $2^{64}$ individual addressable locations. Therefore, often some bits of the memory addresses may effectively be unused and may either always have the same value, or be set as a sign extension of the most significant "real" address bit (so that the unused portion is set to all 0s or all 1s). This unused portion can therefore be reused to represent the address tag or a value for deriving the address tag, to avoid needing to access a separate register in order to obtain the address tag, and also to make it easier to track the correspondence between the addresses and the corresponding address tags as the address tag may by definition be transported along with the address whenever the address is manipulated or moves between registers.

In embodiments which use a portion of the target address to determine the address tag, note that this address tag is different to a tag portion of the target address which may be used by caches to determine whether the information from the addressed location identified by the target address is stored within the cache. Many caching schemes may store a tag portion of the address of a cached piece of data alongside that data within the cache, so that on searching the cache for a given address, part of the address can be compared with the tags stored alongside the cached data in order to determine whether the cached data actually corresponds to the required address. However, in this case the tag portion of the address, which is compared with the tag in the cache would be part of the portion of the address which actually identifies the particular addressed location for which the data is required, i.e. changing the cache tag portion of an address would by definition result in the address pointing to a different addressed location within the memory system. In contrast, with the address tag used for the tag-guarded memory operation, the memory access circuitry may select the addressed location for which data is required independent of the address tag. That is, even if the address tag has different values, the addressed location referenced by the target address may still be the same as the selection of the addressed location depends only on other portions of the target address. This gives the freedom for compilers to set the address tags associated with particular addresses to any value to match the corresponding guard tag values which have been allocated to the relevant blocks of data in the memory system. Also, with cache tagging the storage of tag values into the cache may be controlled by a cache controller and need not be explicitly instructed by a tag setting instruction decoded by the instruction decoder, and typically in response to a memory access to a given addressed location only a single cache tag would need to be set to a new value (the cache tag associated with the cache entry used to cache the data associated with the given addressed location). In contrast, with the multiple guard tag setting instruction the instruction decoder supports a specific instruction for instructing the setting of multiple guard tags associated with different addressed locations in memory.

In some implementations, the instruction decoder could support separate non-tag-guarded and tag-guarded variants of memory access instructions. In this case, the tag-guarded memory access operation could be triggered in response to the tag-guarded variant of the memory access instruction. In contrast non-tag-guarded memory access instructions could simply trigger an access to the addressed location identified by the target address specified by that instruction, without needing to obtain a guard tag or perform any comparison between the address tag and the guard tag.

However, in other implementations all memory accesses may be considered to be tag-guarded memory accesses. Hence, in some cases any memory access instruction may be considered to trigger the memory access circuitry to perform a tag-guarded memory access operation as discussed above.

However, even if all memory access instructions are interpreted as tag-guarded memory access instructions, there may still be other ways in which the instruction set architecture may support selectively disabling the guard tag comparison for certain operations. For example, a control parameter within a control register of the processing apparatus could selectively disable tag comparisons. Another option is for a certain value of the address tag to be interpreted in a special manner so that they indicate that the address tag should be considered to match against any possible value of the guard tag, again effectively disabling the effects of the tag comparison so that no error is reported regardless of whether the address tag matches the guard tag.

The multiple guard tag setting instruction can be implemented in different ways. One particular useful variant is to provide a register-length-specifying variant of the multiple guard tag setting instruction which identifies a length register. In response to this variant the instruction decoder may control the memory access circuitry to update the guard tags associated with a given number of consecutive blocks less than or equal to a maximum number of blocks identified by a length parameter stored in the length register, and control processing circuitry to decrement the length parameter stored in the length register by an amount proportional to the given number. Hence, rather than specifying an absolute number of blocks for which the guard tags are to be updated, the length register specifies a maximum number of blocks for which the corresponding guard tags are allowed to be updated in response to the instruction. The particular number selected as the given number of consecutive blocks (for which the guard tags are to be updated) may be selected on an implementation-by-implementation basis or could vary at run time. This can be useful to provide flexibility in micro architectural design while still enabling the same sequence of instructions to be executed with the expected architectural behaviour across a range of micro architectures. Hence, an implementation-agnostic software routine can be executed using the register-length-specifying variant of the instruction, allowing the implementation to decide the particular granularity of tag setting.

This form of the multiple guard tag setting instruction can be extremely useful because it may be undesirable to commit the memory access circuitry to performing all the update operations for a large region of memory in response to a single instruction. For example, if memory accesses for updating a large number of different guard tags are committed, then this may block resources for handling other operations and may make it harder to reorder memory access operations to improve efficiency. Therefore some micro architecture designers may prefer to constrain how many guard tags can be updated by one instruction. The number of guard tag updates allowed in response to one instruction may vary from implementation to implementation. For example different implementations may implement different cache line sizes in the memory system. An implementation with a larger cache line size may be able to set a greater number of guard tags in response to one instruction than an implementation using a smaller cache line size. Also, even within a particular micro architectural implementation, sometimes the number of guard tags which can efficiently be set in response to one instruction may depend on the relative position of the target address within a cache line. For example it can be more efficient to perform memory accesses aligned to a cache line boundary, and so if the tag values to be updated start part way through a cache line, then it may be more efficient to only update the guard tags which would extend up to the end of a cache line rather than continuing onto the next cache line, so that a subsequent instance of the multiple guard tag setting instruction may then start from an aligned address making the memory accesses more efficient.

Therefore, for a number of reasons, it may be useful to give the memory access circuitry the flexibility to vary how many blocks of memory locations have their guard tags updated in response to the multiple guard tag setting instruction. The maximum number of blocks specified by the length parameter in the length register constrains the update so that the guard tags are not updated beyond the end of the range for which the guard tags need to be set. Since the instruction triggers the processing circuitry to decrement the length parameter based on the given number of blocks for which the guard tags were updated, this means that a loop of instructions including the multiple guard tag setting instruction can be defined to initially specify the required number of blocks for which the guard tag are to be updated in the length register and then the loop can iterate through multiple instances of the multiple guard tag setting instruction, each iteration decrementing the length parameter by an amount proportional to the number of blocks for which the tags have been updated, until the loop may be exited once the length parameter has been decremented to zero, at which point the required number of tags will have been set. This enables exactly the same loop to execute on a range of different micro architectures regardless of how many blocks are actually given updated as a guard tag value in response to a single instance instruction.

In some examples, the length parameter could specify the exact number of blocks for which the tags are to be updated. In this case, the amount by which the length parameter is decremented may be equal to the given number itself.

Alternatively, in some implementations the amount by which the length parameter is decremented could be greater or less than the number of blocks for which the guard tags are updated, but proportional to the number of blocks for which the guard tags are updated.

For example, for some implementations the length parameter could be specified as a number of bytes of memory for which the guard tags are to be set. The micro-architecture could select a particular number of bytes less than or equal to the maximum defined in the length parameter, and set the guard tags for the selected number of bytes of memory. As each guard tag may correspond to multiple bytes of memory, this may mean that the amount by which the length parameter is decremented may be proportional to, but greater than, the number of tags that are updated in response to the instruction.

In other examples, the length parameter could define the length parameter in terms of a multiple of some base granularity of blocks. In this case, the length parameter could specify how many multiples of blocks are to be updated, so that the amount by which the length parameter is decremented may be proportional to, but less than, the number of guard tags that are actually updated. For example, for some micro-architectures, it could be more efficient to update guard tags at the granularity of the number of guard tags which fit in one guard memory location, or the number of guard tags which are associated with one data memory location. In this case, to reduce the number of bits needed for the length parameter, the length parameter could actually specify the number of data/guard memory locations for which the corresponding tags are to be updated, not the absolute number of guard tags. The tag setting instruction could therefore trigger the length parameter to be decremented by an amount corresponding to the number of updated guard tags divided by the number of guard tags corresponding to the base granularity at which guard tags are allowed be updated.

Nevertheless, while the register-length-specifying variant may provide an extremely flexible architecture supporting different micro architectures, in other examples an immediate-length-specifying variant of the multiple guard tag setting instruction could be provided, in which an immediate parameter specified in the encoding of the instruction identifies how many blocks of the memory system are to be given updated guard tag values. In response to the immediate-length-specifying variant, the instruction decoder may control the memory access circuitry to update the guard tags associated with the number of consecutive blocks specified by the immediate parameter. Hence, in this case the micro architecture may have no choice in how many blocks are to have their guard blocks updated, but may simply update the number of guard tags indicated by the immediate parameter.

It would also be possible to provide a register-based variant which specifies a length register indicating the absolute number of blocks for which the guard tags are to be updated, which may behave in a similar way to the immediate-length-specifying variant, so the length parameter in the register may specify the exact number of blocks for which the tags are to be updated, rather than a maximum number of blocks as in the register-length-specifying variant discussed above.

The multiple guard tag setting instruction may specify a tag update target address which identifies the consecutive blocks of memory for which the guard tags are to be updated. In general, the at least two consecutive blocks targeted by the multiple guard tag setting instruction may comprise the memory location which is actually identified by the tag update target address and at least one subsequent block of memory locations which is consecutive to the memory location identified by the tag update target address. Note that the one or more memory accesses triggered by the multiple guard tag setting instruction are not writes to the tag update target address itself or to the subsequent blocks of memory locations following the memory location identified by the tag update target address. Instead, the one or more memory writes triggered by the multiple guard tag setting instruction may target the storage locations at which the guard tags which correspond to the consecutive blocks of memory identified by the tag update address are stored.

The multiple guard tag setting instruction may use an address register to define the tag update target address. The address register may store an address determining value for determining the tag update target address which identifies the at least two consecutive blocks for which the guard tags are to be updated. For example, the address register could specify an absolute address corresponding to the tag update target address, or could specify an offset which is to be added to a base address in order to obtain the tag update target address. The base address could be specified in a separate register or could be implicit, e.g. some variants of instructions may use program counter relative addressing and so the base address could comprise a program counter which indicates a current address reached during program execution.

In general, regardless of whether the register-length-specifying variant or immediate-length specifying variant discussed above is used, in response to the multiple guard tag setting instruction, the instruction decoder may control processing circuitry to increment or decrement the address determining value stored in the address register by an offset corresponding to the number of blocks in memory locations for which the guard tags are updated in response to the multiple guard tag setting instruction. This means that when the multiple guard tag setting instruction is provided within a loop then the address register is automatically updated to point to the next address after the last block of memory locations for which the guard tag was updated, so that there is no need to include an additional instruction for manipulating the address register. This helps improve code density and performance. The loop of instructions could traverse a given memory region from lowest address to highest address (incrementing the address in the address register by the offset each time) or from highest address to lowest address (decrementing the address by the offset each time).

The updated tag value used to update the guard tags may be derived from the multiple guard tag setting instruction in different ways. In some cases, the updated tag value could be represented using one or more selected bits of the tag update target address, in a similar way to the way in which the address tag for the tag-guarded memory access can be represented within a portion of the target address. Hence, in some examples, in response to the multiple guard tag setting instruction, the instruction decoder may control the memory access circuitry to trigger memory accesses to update the guard tags associated with at least two consecutive blocks to an updated tag value determined as a function of one or more selected bits of the tag update target address.

Alternatively, some forms of instruction may specify a tag value register for identifying the updated tag value, separate from any register used to identify the tag update target address. In this case in response to the multiple guard tag setting instruction, the instruction decoder may control the memory access circuitry to trigger memory accesses to update the guard tags associated with the at least two consecutive blocks to an updated tag value determined as a function of a value stored in a tag value register specified by the multiple guard tag setting instruction independent from the tag update target address.

Which of these two approaches is taken may be determined based on a trade off between the encoding overhead within the multiple guard tag setting instruction and the expected overhead in setting the updated tag values for a given instruction. The first approach of representing the updated guard tag within the update target address may avoid the need to provide a further register identifier within the instruction encoding, leaving more encoding space available for other purposes, which can be useful as encoding space is often at a premium within instruction set architectures. On the other hand, if the updated tag value is stored in a separate tag value register then this avoids the need for a separate instruction to write the desired updated tag value into a portion of the tag update target address before executing the multiple guard tag setting instruction, which could reduce code density. Both options can be used.

A data-clearing variant of the multiple guard tag setting instruction can also be provided. In response to this variant, the instruction decoder may control the memory access circuitry, in addition to setting the updated guard tags, to also trigger memory accesses for setting data values stored in the at least two consecutive blocks of one or more memory locations to a cleared value. The cleared value may be any value which is uncorrelated with a previous value of the data value. For example, cleared value could be a predetermined value, such as zero, or a randomly generated value. This can be useful since often the guard tag setting may be performed as part of a process for initialising blocks of memory and at the same time it may also be desired to clear the contents of the initialised block of memory to some predetermined value to avoid data previously stored in that region of the address space being visible to the subsequently executed code. By providing a data-clearing variant of the multiple guard tag setting instruction, this avoids a need to execute a second instruction for clearing the data, as the guard tag setting and data clearing can both be performed in response to a single instruction. Any of the types of multiple guard tag setting instruction described above could be provided with an additional data clearing variant as well, so that both non-data clearing and data-clearing variants of the same form of multiple guard tag setting instruction can be provided. Alternatively, in some implementations all the multiple guard tag setting instruction variants could by definition be data-clearing variants, so some implementations may not support any non-data-clearing variants of the multiple guards and tag setting instruction.

All of the variants of the multiple guard tag setting instruction described above may be instructions which, for at least some values of its parameters (either register-specified parameters or immediate parameters), may trigger the memory access circuitry to update the guard tags associated with at least two consecutive blocks of memory locations. However, the same types of instructions could, for other values of the parameters, trigger updating of only a single guard tag, or could in some instances trigger no updates to any guard tags at all. For example, if the length parameter specified in the length register of the register-length-specifying variant is zero then the instruction may not trigger any guard tags to be updated. Similarly if the length parameter specifies 1 then the maximum number of guard tags to be updated in response to the instruction may be 1. Hence it will be appreciated that some instruction opcodes could sometimes function as a multiple guard tag setting instruction and other times function as a single guard tag setting instruction, depending on the parameters specified by the instruction. In general the multiple guard tag setting instructions described above may be any instruction which is capable, for at least some values of its parameters, of triggering two or more consecutive blocks of memory locations to have their guard tags set to an updated value.

In addition to the multiple guard tag setting instructions or the type discussed above, the instruction set architecture supported by the instruction decoder and the processing circuitry may also include a single guard tag setting instruction, in response to which the instruction decoder controls the memory access circuitry to set the guard tag associated with a single block of memory locations to an updated value. For example, the single guard tag setting instruction may have a different opcode to the multiple guard tag setting instruction, and may be incapable of triggering the memory access circuitry to update more than one guard tag.

FIG. 1 schematically illustrates an example of a data processing apparatus 2. It will be appreciated that this is simply a high level representation of a subset of components of the apparatus and the apparatus may include many other components not illustrated. The apparatus 2 comprises processing circuitry 4 for performing data processing in response to instructions decoded by an instruction decoder 6. The instruction decoder 6 decodes instructions fetched from an instruction cache 8 to generate control signals 10 for controlling the processing circuitry 4 to perform corresponding processing operations represented by the instructions. The processing circuitry 4 may include one or more execution units for performing operations on values stored in registers 14 to generate result values to be written back to the registers. For example the execution units could include an arithmetic/logic unit (ALU) for executing arithmetic operations or logical operations, a floating-point unit for executing operations using floating-point operands and/or a vector processing unit for performing vector operations on operands including multiple independent data elements. The processing circuitry also includes a memory access unit (or load/store unit) 15 for controlling transfer of data between the registers 14 and the memory system. In this example, the memory system includes the instruction cache 8, a level 1 data cache 16, a level 2 cache 17 shared between data and instructions, and main memory 18. It will be appreciated that other cache hierarchies are also possible—this is just one example. A memory management unit (MMU) 20 is provided for providing address translation functionality to support memory accesses triggered by the load/store unit 15. The MMU has a translation lookaside buffer (TLB) 22 for caching a subset of entries from page table stored in the memory system 16, 17, 18. Each page table entry may provide an address translation mapping for a corresponding page of addresses and may also specify access control parameters, such as access permissions specifying whether the page is a read only region or is both readable and writable, or access permissions specifying which privilege levels can access the page.

Figure 2:
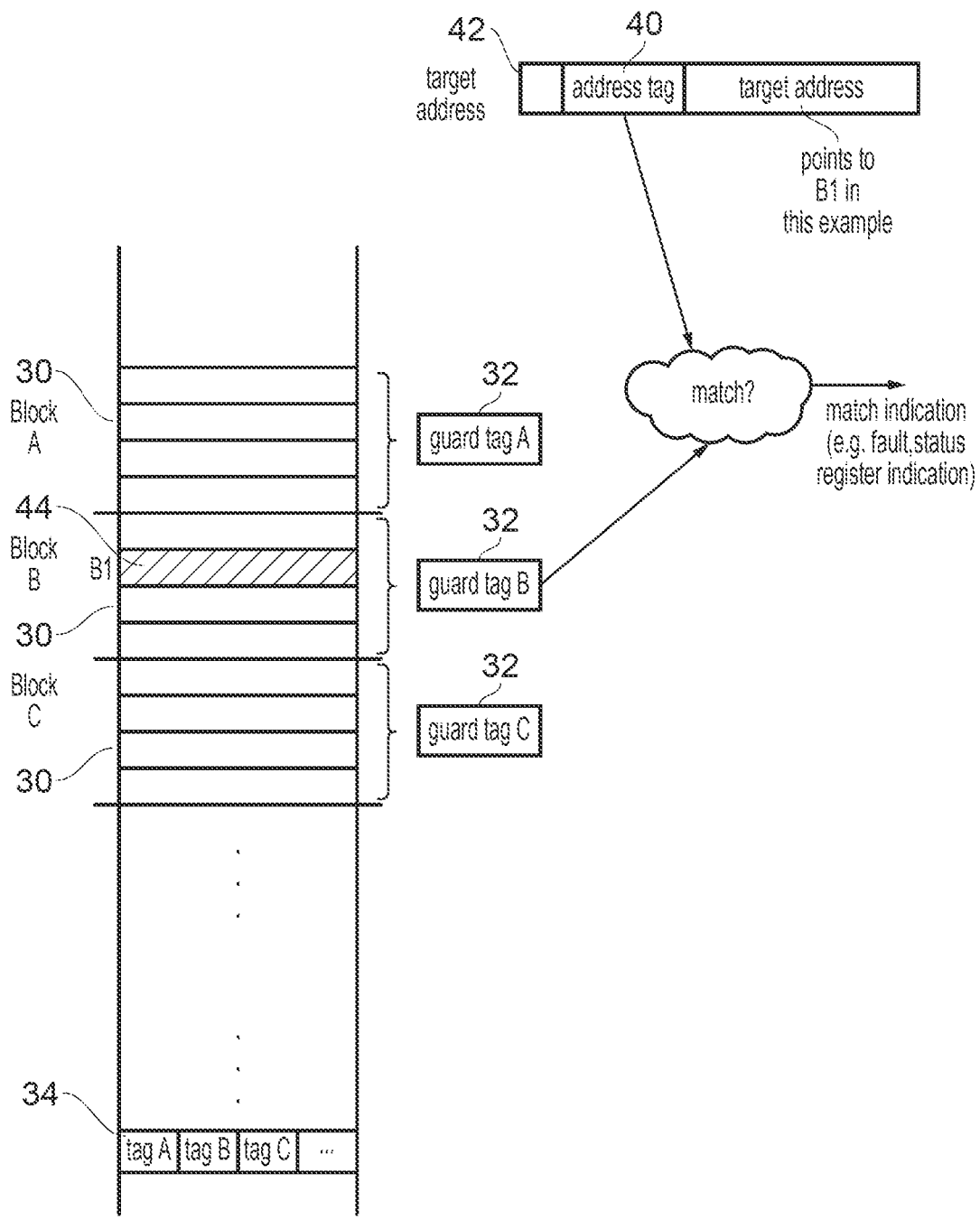
FIG. 2 shows an example of a tag-guarded memory access operation comprising checking whether an address tag matches a guard tag.

FIG. 2 schematically illustrates a concept of tag-guarded memory accesses. The physical address space used to refer to memory locations within the memory system may be logically partitioned into a number of blocks 30 each comprising a certain number of addressable locations. For conciseness, in the example of FIG. 2, each block 30 comprises four memory locations, but other block sizes could be used as well. Each block 30 is associated with a corresponding guard tag 32. The guard tags associated with a certain number of blocks 30 can be gathered together and stored either within a different architecturally accessible memory location 34 within the physical address space, or within additional storage locations provided in main memory 18 which are not architecturally accessible (not mapped to the same physical address space). The use of separate non-architecturally accessible storage may in some cases be preferred to avoid using up space in the data caches 16, 17 for caching guard tag values, which could impact on the performance of the regular code and could make coherency management more complex. An additional tag cache 19 could be provided in the micro architecture for caching tag values from the non-architecturally accessible storage, for faster access than if the tags had to be accessed from main memory 18. The particular mapping of which tag storage locations 34 correspond to each block 30 may be controlled by the load/store unit 15 and could be hardwired or could be programmable. While in FIG. 2 each tag 32 is associated with a block of physical addresses, it would also be possible to provide guard tags 32 associated with virtual memory locations in a virtual memory address space, but this may require some additional address translations on each memory access. Hence by associating the guard tag 32 with physical memory locations this can improve performance. In general it is a choice for the particular micro architectural implementation exactly how the guard tags 32 are associated with the corresponding blocks 30 of the physical address space. In general, all that is required is that the guard tag 32 associated with a given block of memory can be accessed and compared.

Hence, when a tag-guarded memory access is required, an address tag 40 (which is associated with the target address 42 identifying the addressed location 44 to be accessed), is compared against the guard tag 32 which is associated with the block of memory locations 30 which includes the addressed location 44. For example, in FIG. 2 the target address 42 points to a certain location B1 in memory, marked 44 in the address space of FIG. 2. Therefore the guard tag B which is associated with the block of locations B including location B1 is compared against the address tag 40 associated with a target address 42. As shown in the top of FIG. 2, the address tag 4 may be determined as a function of selected bits of the target address itself. In particular, the address tag may be determined from bits within a portion of the target address which is unused for indicating the specific memory location which is to be selected as the addressed location 44. For example, in some architectures the top portion of bits of the target address may always have a certain fixed value such as a sign extension (all 0s or all 1s) and so an address can be tagged with the address tag 40 by overwriting these unused bits with an arbitrary tag value. The particular address tag value can be selected by a programmer or compiler for example. The address tag and guard tag 32 can be a relatively small number of bits, e.g. 4 bits, and so need not occupy much space within the memory and within the target address. Providing 4 bits of tag space, i.e. 16 possible values of the tags, can often be enough to detect many common types of memory access errors.

Hence, when a tag-guarded memory access is performed, the load/store unit 15 compares the address tag 40 and the guard tag 32 associated with a block 30 including the addressed location 44, and determines whether they match. The load/store unit 15 generates a match indication indicating whether the address tag 40 and the guard tag 32 matched. For example, this match indication could be a fault signal 60 which is generated if there is a mismatch between the address tag 40 and the guard tag 32, or an indication placed in a status register indicating whether there was a match, or an entry added to an error report to indicate the address for which the error was detected and/or the instruction address of the instruction which triggered the error.

Figure 3:
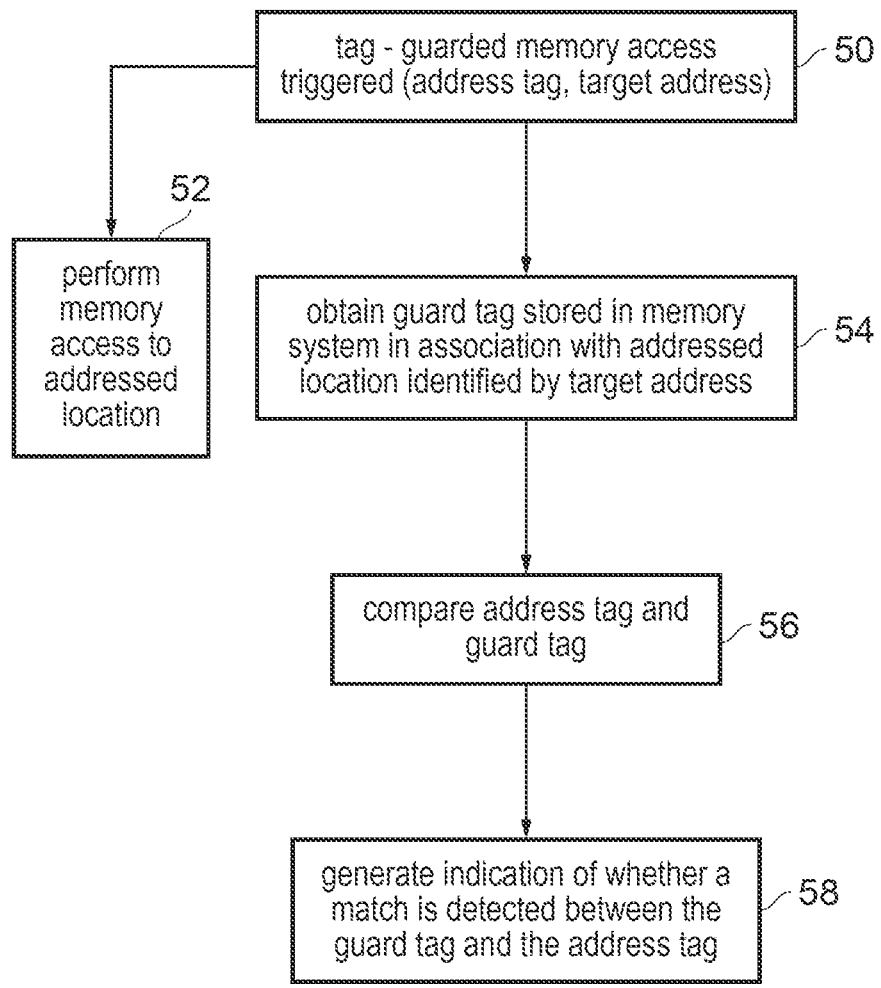
FIG. 3 is a flow diagram showing a method of performing a tag-guarded memory access operation.

FIG. 3 shows a flow diagram for handling a tag guarded memory access. The instruction triggering the memory access may specify an address tag and a target address. As shown in FIG. 2, in some cases the address tag may actually be derived from a subset of bits of the target address itself, although in other examples it could be specified in a separate register. At step 50, the instruction triggering the tag guarded memory accesses is encountered. In response, at step 52 the memory access circuitry 15 triggers a memory access to the addressed location 44 identified by the target address. Also, at step 54 the memory access circuitry 15 obtains the guard tag 32 which is stored in the memory system in association with the block of memory locations 30 that includes the addressed location 44 identified by the target address. At step 56 the memory access circuitry 15 compares the address tag 40 with the guard tag 32 obtained at step 54. At step 58 an indication of whether a match is detected between the guard tag and the address tag is generated by the memory access circuitry 15 (e.g. any of the types of match/mismatch reporting indication described above). The precise indication used to report any mismatch may vary from implementation to implementation.

Figure 4:
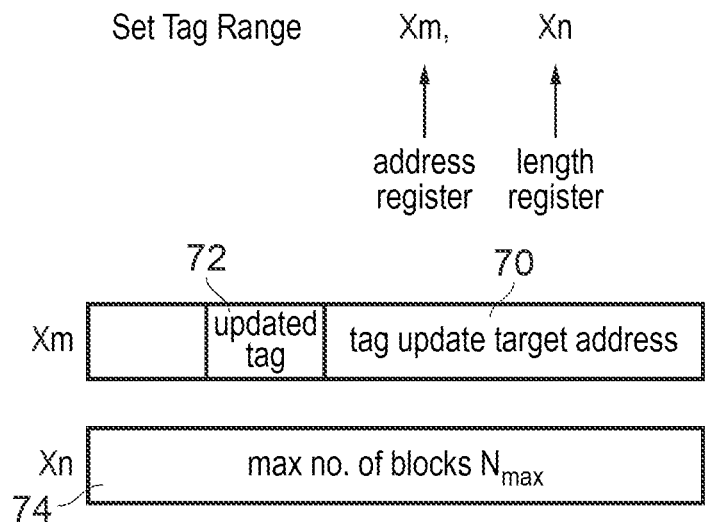
FIG. 4 shows a register-length-specifying variant of a multiple guard tag setting instruction.

FIG. 4 illustrates an example of a register-length-specifying variant of a multiple guard tag setting instruction. The instruction specifies as its parameters an address register Xm which specifies a tag update target address 70, which also includes an updated tag value 72 specified using a subset of bits of the address. The instruction also specifies a length register Xn which specifies a maximum number of blocks 74 $N_{max}$ to be updated in response to the instruction.

Figure 5:
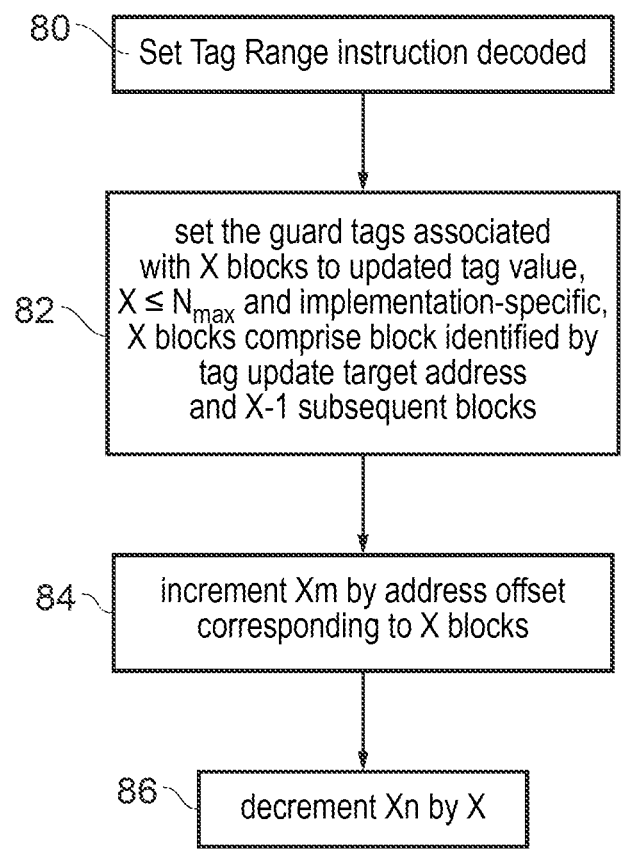
FIG. 5 is a flow diagram illustrating a method of processing the instruction of FIG. 4.

FIG. 5 is a flow diagram illustrating processing of the instruction of FIG. 4 by the apparatus 2 of FIG. 1. At step 80 the multiple guard tag setting instruction is decoded by the instruction decoder 6. In response, the instruction decoder 6 generates control signals for controlling the processing circuitry 4 and load/store unit 15 to perform the subsequent steps of FIG. 5. At step 82 the load/store unit 15 generates signals for requesting that the memory system performs at least one memory access for setting the guard tags associated with X blocks of memory locations to an updated tag value specified by the updated tag 72 derived from address register Xm. The number of blocks X to be updated may be any number less than or equal to $N_{max}$, the maximum number of blocks 74 specified in length register Xn. The particular value for X may be implementation-specific. That is, the instruction set architecture comprising the instruction of FIG. 4 does not specify what particular value of X needs to be selected. A given processor implementation is free to select any value for X that is convenient for that particular micro-architectural implementation. In cases where X is 2 or more, then the X blocks of memory 30 whose guard tags are updated comprise the block that is identified by the tag update target address 70 and X−1 subsequent blocks which follow on consecutively from the block identified by the tag update target address. In cases where X=1 then only the block identified by the tag update target address has its guard tag updated. If X=0, which could occur if the length register Xn specifies $N_{max}$=0, then no blocks of memory 30 have their corresponding guard tags 32 updated.

At step 84, the control signals generated by the instruction decoder 6 control the processing circuitry 4 to increment the tag update target address 70 specified in address register Xm by an address offset which corresponds to X blocks of memory. That is, the address offset may correspond to X times the size of one memory block 30, where the block size is dependent on a particular granularity with which guard tags 32 are allocated to memory locations (which may be selected as an implementation-dependent parameter). Hence, Xm'=Xm+X*(block size). In other examples, the address in register Xm could be decremented by X*(block size).

Figure 6:
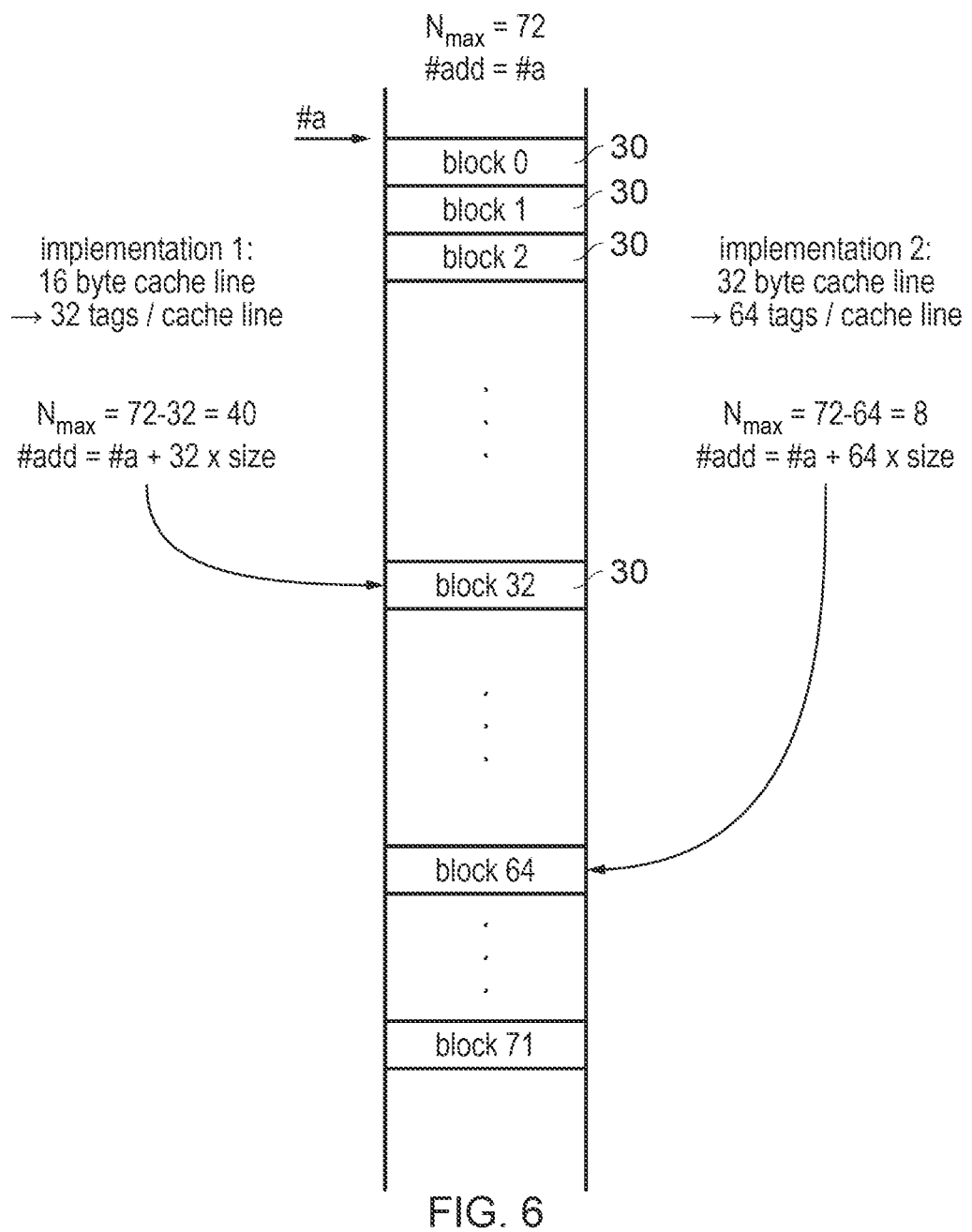
FIG. 6 illustrates an example of different micro-architectural implementations responding to the same multiple guard tag setting instruction to update different numbers of tags.

Also, at step 86 the control signals control the processing circuitry 4 to decrement the length register Xn by an amount proportional to X, the number of blocks for which the guard tags were updated in response to the instruction. In the example of FIG. 6, Xn'=Xn−X.

In other examples, the length register Xn could, instead of representing the actual maximum number of blocks for which the tags are to be updated, represent the length in terms of a number of some multiple of blocks, or in terms of the number of bytes of the size of the address range for which the guard tags are to be set, in which case Xn could be decremented by less than or greater than X. For example, if the base granularity at which tags can be updated is G, then the length register Xn could specify a length parameter $N_G$ indicating the number of multiples of G tags to be updated, i.e. $N_{max}=N_G*G$. In this case, at step 82 the micro-architecture implementation may be constrained to choose a value of X which is a multiple of G, and at step 86 the length parameter $N_G$ may be decremented by X/G instead of X. In another example, if the length parameter specifies a maximum value B indicating the maximum number of bytes of memory for which the corresponding guard tags are to be updated, and each guard tag is associated with a K-byte block of memory locations, then the address register may be incremented/decremented to Xm'=Xm±X, where X is a multiple of K less than or equal to B, and the length register Xn may be decremented to Xn'=Xn−(X*K). For example, if each tag is associated with 16 bytes of memory (K=16), and the micro-architecture chooses to update, say, 2 tags per instance of the instruction (X=2), then SetTagRange x1, [x2]! with length parameter x1=128 and start address x2=0x8000 could trigger the processing circuitry to set 2 tags and then decrement x1 to 128−2*16=96, and increment x2 to 0x8020.

FIG. 6 illustrates why this form of instruction can be particularly useful to allow software to use an implementation agnostic routine, regardless of the particular granularity of tag setting used for a given micro-architectural implementation. For example, a loop maybe defined in the executed code as follows:

X0=base address
X1=length
Loop:
SetTags [X0]!, X1
CBNZ X1, loop; compare X1 with zero and branch to 'loop' if not FIG. 6 shows an example where the base address is specified as address #a and the length to 72. One potential processor implementation of this architecture could use 16-byte cache lines, so in one implementation if each guard tag 32 comprises 4 bits then there is space for 32 tags to be stored in a single cache line. A cache line is the unit of memory which can be read/written in one request by the memory system. It can often be more efficient to carry out operations at the granularity of one cache line. Hence, in implementation 1, it may be preferred to update 32 tags in response to the multiple guard tag setting instruction of FIG. 4. In this case, executing the instruction on implementation 1 may result in 32 of the 72 blocks of the memory having their guard tag updated, so register X1 providing $N_{max}$ is reduced to 72−32=40, and the tag update target address in register X0 incremented to address #a+32*(block size) so that it now points to block 32. The next iteration of the loop will then set new tag values for the next 32 blocks of memory and so on until the final block 71 has its tag updated, and the conditional branch instruction CBNZ will then exit the loop because X1 has been decremented to zero.

In contrast, for a different micro-architectural implementation 2 using 32-byte cache lines, 64 tags can fit within one cache line and in this case it may be preferred to update more tags per instance of the tag setting instruction. In this case, one execution of the instruction may set 64 tags, i.e. the given number X shown in FIG. 5 is 64. In FIG. 6, $N_{max}$ is decremented to 72−64=8 on the first iteration of the loop, and the address updated to point to block 64 at address #a+64*(block size). The final 8 tags are set in the second iteration of the loop.

In other example implementations, guard tags may be stored in caches next to the data that they are guarding. For example, a cache line of a given size (e.g. 64 byte cache lines) may be extended with a certain number of guard tags each corresponding to a certain portion of the cache line. For example, if each tag corresponds to 16 bytes of the cache line then 4 4-bit tags could be associated with each cache line. In this case, such a micro-architecture may prefer to limit to setting 4 guard tags per instance of the tag setting instruction. Again, the loop above may still function on such a micro-architecture, but will require more iterations of the loop before all of the guard tags have been set, compared to the 2 implementations shown in FIG. 6

Hence, different implementations can set different numbers of tags per instruction, but nevertheless the same program loop can be executed regardless. While some implementations may require more iterations of the loop to set the required tags than other implementations, each implementation will eventually branch out of the loop once the value in the length register Xm has been reduced to zero.

Figure 7:
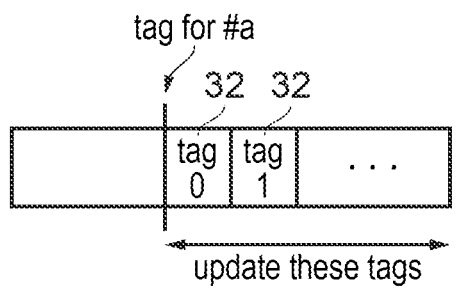
FIG. 7 shows an example of a micro-architecture having the flexibility to vary how many tags are updated based on cache line alignment.

FIG. 7 illustrates another reason why it may be useful to give a micro-architectural implementation flexibility to update different numbers of tags. Depending on alignment of a supplied address #a, the tags to be updated may start part way through a cache line. In this case, it may be preferred for the instruction to only update the tags in the remainder of the cache line so that the next iteration of the loop can start updating tags aligned to a cache line boundary, making subsequent accesses more efficient. In contrast, an implementation which always updates the same number of tags in response to the instruction could not use such micro architectural optimisations.

Figure 8:
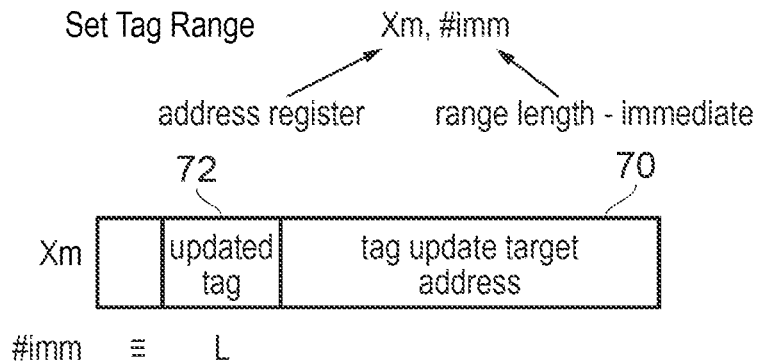
FIG. 8 illustrates an immediate-length-specifying variant of the multiple guard tag setting instruction.

FIG. 8 shows an alternative form of multiple guard tag setting instructions which uses an immediate value #imm to specify the length of the range of memory for which guard tags are to be set to an updated tag value 72. The target update tag target address 70 and updated tag value 72 may still be specified in an address register Xm the same as in FIG. 4, but this time the immediate value #imm specified in the instruction encoding specifies an absolute length indication L which indicates the precise number of blocks for which the tags values are to be updated.

Figure 9:
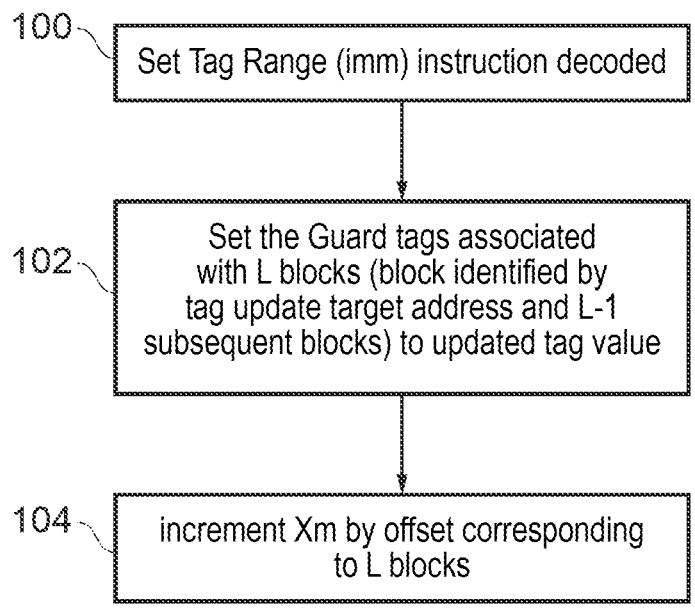
FIG. 9 is a flow diagram illustrating a method of processing the instruction of FIG. 6.

FIG. 9 illustrates a flow diagram showing a method of controlling processing of this type of instruction shown in FIG. 8. At step 100 the instruction decoder 6 decodes the immediate-length-specifying variant of the guard tag setting instruction shown in FIG. 8. In response the instruction decoder generates control signals for controlling the memory access circuitry 15 at step 102 to set the guard tags that are associated with L blocks of memory locations to the updated tag value 72. Again, when L is equal to 2 or more then the L blocks comprise the block identified by the tag update target address 70 and L−1 subsequent blocks will follow on consecutively from the block identified by the tag update target address. If L=1 then only the tag associated with the block identified by the tag update target address is updated. If L=0 then no guard tags are updated. At step 104 the control signals generated by the instruction decoder 6 also control the processing circuitry 4 to update the address register Xm to increment the address by an offset corresponding to L blocks, i.e. Xm'=Xm+L*(block size).

Figure 10:
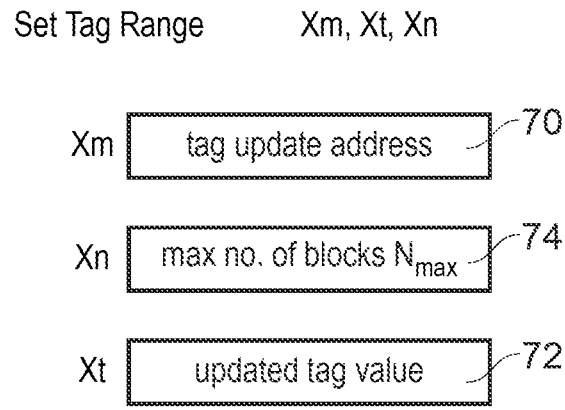
FIG. 10 illustrates an alternative variant of the instruction of FIG. 4 in which the updated tag value is specified using a separate register to the tag updated address.

FIG. 10 shows a variation of the instruction shown in FIG. 4, in which the updated tag value 72 is specified in a third register Xt separate from the tag update address 70 which is specified in the address register Xm. Otherwise the behaviour of this instruction is exactly the same as shown in FIGS. 4 and 5. It will be appreciated that a similar variant of the immediate-specifying instruction shown in FIG. 8 could be provided, with the update tag value 72 specified independently from the tag update address 70.

Figure 11:
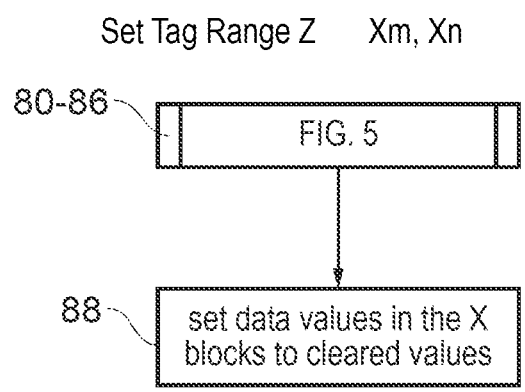
FIG. 11 illustrates a data-clearing variant of the multiple guard tag setting instruction.

FIG. 11 shows a data-clearing variant of the instruction of FIG. 4. The address register Xm and length register Xn specify the same parameters as shown in FIG. 4. In response to this instruction, steps 80-86 are preformed in the same way as shown in FIG. 5. However, in response to the data clearing variant of the instruction an additional step 88 is performed. At step 88, the instruction decoder 6 controls the memory access circuitry 15 to generate additional memory accesses for setting the data values in the X blocks of memory to cleared values uncorrelated with the previous values of those data values (e.g. to a predetermined value, such as 0, or to a random value). This avoids the need for a separate instruction for clearing the data values in addition to the tag setting instruction, enabling a tighter loop and smaller code density. While FIG. 11 shows an example of a data clearing variant applied to the form of instruction shown in FIG. 4, similar data clearing variants could also be implemented for any of the other types of multiple tag setting instructions described above.

Figure 12:
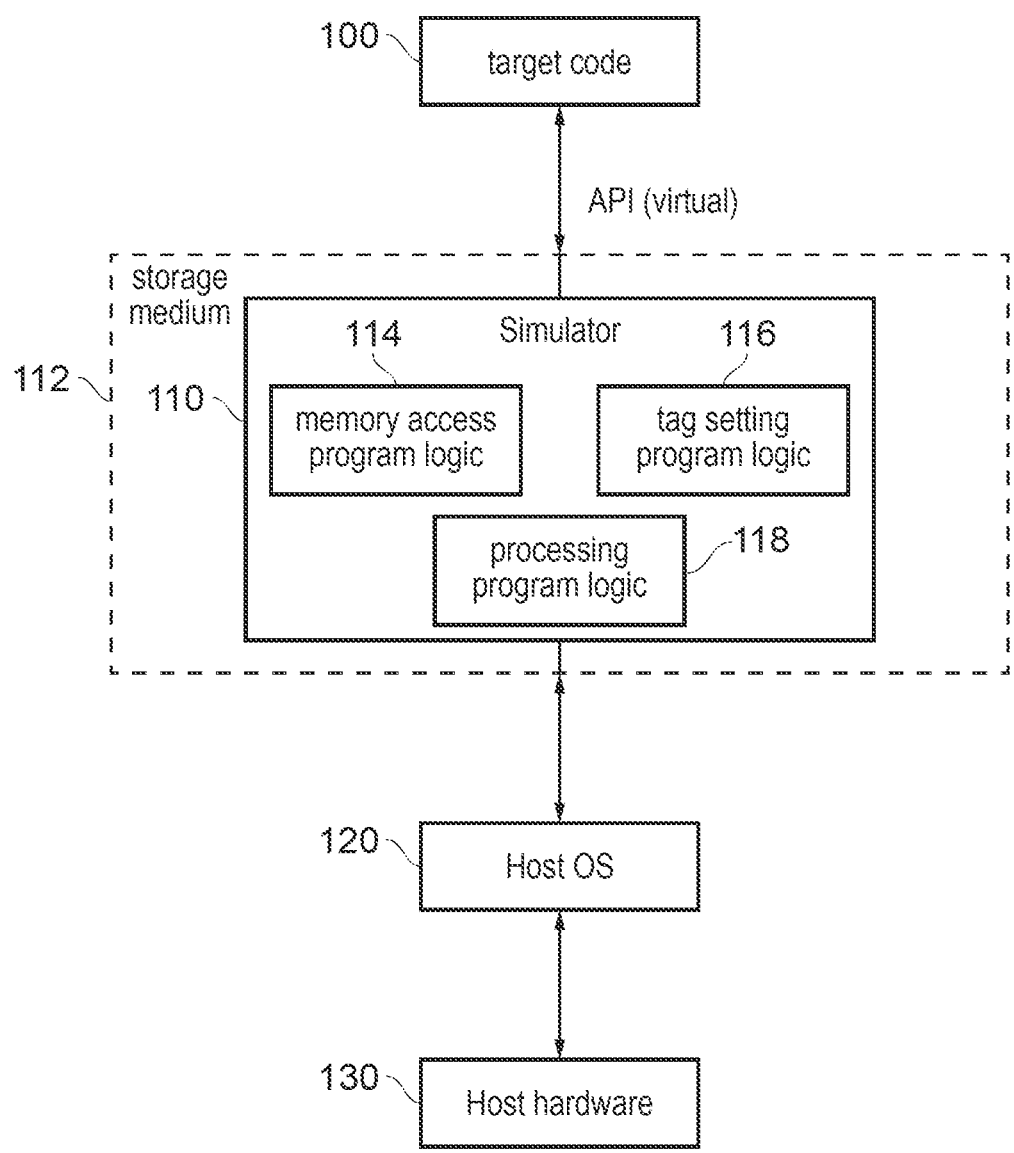
FIG. 12 shows an example of a simulator computer program.

FIG. 12 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 130, optionally running a host operating system 120, supporting the simulator program 110. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 130), some simulated embodiments may make use of the host hardware, where suitable.

The simulator program 110 may be stored on a computer-readable storage medium 112 (which may be a non-transitory medium), and provides a program interface (instruction execution environment) to the target code 100 (which may include applications, operating systems and a hypervisor) which is the same as the application program interface of the hardware architecture being modelled by the simulator program 110. Thus, the program instructions of the target code 100, including the multiple guard tag setting instruction described above, may be executed from within the instruction execution environment using the simulator program 110, so that a host computer 130 which does not actually have the hardware features of the apparatus 2 discussed above can emulate these features. For example, the simulator program 110 may include memory access program logic 114 for controlling access to memory by instructions of the target code 100. For example, the memory access program logic 114 may include instructions for performing the comparison of the guard tag and the address tag and reporting whether any mismatch between the guard tag and address tag has been detected. Also, the simulator program 110 may include tag setting program logic 116, which comprises instructions for triggering, in response to a multiple guard tag setting instruction included in the target code 100, one or more memory accesses for setting the guard tags in a corresponding way to the way in which the hardware embodiment would set the tags. In the simulator approach, the number of tags X set in response to the register-length-specifying variant of the multiple guard tag setting instruction may be selected by the simulator program 110.

Also, the simulator program 110 may include processing program logic 118 which emulates the instruction decoder 6 and processing circuitry 4 of a hardware embodiment, to perform data processing in response to the instructions of the target code 100. For example, the processing program logic 118 may include sets of instructions to select, based on an encoding of an instruction included in the target code 100, a corresponding set of instructions in the native instruction set supported by the host computer 130 which emulates the functionality of that instruction of the target code 100.

The memory access program logic 118 of the simulator program 110 may support use of a programmable mapping of guard tag storage locations as discussed further below, so that the memory access program logic 118 is configured to determine, according to a programmable mapping, a mapping of guard tag storage locations for storing guard tags for corresponding blocks of memory locations.

Programmable Mapping of Guard Tag Storage Locations

An apparatus comprises processing circuitry to perform data processing in response to instructions; and memory access circuitry to perform a tag-guarded memory access operation in response to a target address, the tag-guarded memory access operation comprising: comparing an address tag associated with the target address with a guard tag stored in a memory system in association with a block of one or more memory locations comprising an addressed location identified by the target address; and generating an indication of whether a match is detected between the guard tag and the address tag; in which: the memory access circuitry is configured to determine, according to a programmable mapping, a mapping of guard tag storage locations for storing guard tags for corresponding blocks of memory locations.

Hence, as mentioned earlier, the memory access circuitry can determine, according to a programmable mapping, a mapping of guard tag storage locations for storing guard tags for corresponding blocks of memory locations. Supporting a programmable mapping of the guard tag storage locations can be useful to reduce system implementation costs because in systems where tags are not always used or are not extensively used, permanently allocating a fixed region of storage for storing the guard tags (either as a separate guard tag storage region of memory not accessible in the normal address space used for data, or as a permanent carve out from the address space otherwise used for data) can be expensive in terms of circuit area and power cost and may reduce the amount of physical memory storage which can effectively be used by software when tag usage is relatively sparse. For example, one approach to allocating a fixed tag storage region could be to carve out a certain percentage, for example 3%, of the address space for storing the guard tags associated with data in other parts of the physical address space. While 3% may not sound a lot, in a data center having a large amount of storage, 3% of a lot of storage is still a relatively large amount of storage and so if software then does not make significant use of tag-checked memory accesses, a relatively large amount of memory storage provided in hardware may be inefficiently used.

Therefore, in the examples discussed here, the memory access circuitry can determine the mapping of the guard tag storage locations based on a programmable mapping so that the locations allocated for storing guard tags do not need to be fixed, and this offers much more flexibility to vary the mapping of guard tag storage locations based on those actually needed for the software being executed to avoid wasting memory capacity on storage for guard tags.

An amount of address space allocated for the guard tag storage locations may be variable depending on the programmable mapping. Hence, using the programmable mapping, the total capacity allocated for the guard tag storage locations can be scaled depending on expected need, to avoid needing to permanently allocate a certain amount of space for guard tags regardless of need.

The programmable mapping may support at least: a first configuration in which a given portion of address space is allocated for the guard tag storage locations; and a second configuration in which the given portion of the address space is allocated for blocks of one or more memory locations for storing data or instructions. Hence, by using a programmable mapping it is possible to repurpose portions of the address space as either being allocated for guard tag storage locations or as being allocated for storing data or instructions, to provide variable partitioning between the regions allocated for guard tag storage locations and the regions allocated for data or instructions. This provides a much more flexible approach so that the size of the guard tag storage regions can be tailored to the expected usage.

The processing circuitry of the apparatus may support an instruction set architecture which has architecturally defined mechanisms for accessing guard tags.

For example, the ISA of the processing circuitry may support at least one type of non-guard-setting store instruction and at least one type of guard tag set instruction. In response to a non-guard-tag-setting store instruction executed by the processing circuitry, the memory access circuitry is configured to trigger at least one memory access to update data stored in a memory location other than the guard tag storage locations, without updating the guard tag storage locations; and in response to a guard tag setting instruction executed by the processing circuitry, the memory access circuitry is configured to trigger at least one memory access to update at least one guard tag stored in at least one guard tag storage location. The guard tag setting instruction and the non-guard-tag-setting store instruction may be different instructions of the instruction set architecture supported by the processing circuitry.

An alternative approach could be a "tags stored as data" approach where regular store instructions would be used to write guard tags to data addresses in the address space, so that there is no dedicated instruction type for setting guard tags. However, the "tags stored as data" approach can add difficult to hide overheads to general purpose load and store instructions by increasing pressure on translation and data caches and so may be unsuitable to certain usage patterns.

In contrast, with an approach with architected mechanisms for setting the tags separate from the store instructions, guard tag updates can be treated as separate from general writes to memory for store instructions, which can simply the hardware design. Nevertheless, the use of the programmable mapping can help to reduce the system cost by avoiding unnecessarily large sized allocations of tag storage regions.

In some examples the guard tag setting instruction could specify a target address of a corresponding data location but may cause the guard tag that is associated with that data memory location to be updated (so that the location that is updated in response to the guard tag setting instruction may not be the memory location actually identified by the address specified by the guard tag setting instruction, as the address of the tag storage location could be derived from the corresponding data address).

In some implementations, the instruction set architecture (ISA) may have complete separation between the store instructions and the guard tag setting instructions so that these are different instructions altogether.

However, other examples could also provide a guard-tag-setting store instruction which triggers both a guard tag setting operation to update a guard tag storage location and a data store operation to update the corresponding data memory location, with both operations performed in a single instruction. In this case, while the ISA may include at least one non-guard-tag-setting store instruction which is a different instruction to a guard tag setting instruction, this does not exclude the option of also having guard-tag-setting store instructions which effectively function as both a store instruction and a guard tag setting instruction.

The memory access circuitry may control access to the guard tag storage locations and to other memory locations other than the guard tag storage locations, where a minimum data size for a memory access to the guard tag storage locations is different to a minimum data size for a memory access to the other memory locations. Again, this may reflect that the ISA may support different architectural mechanisms for accessing guard tags compared to accessing non-guard-tag data stored in memory and so the granularity of access may be different. For example, regular memory may be accessed with byte-size granularity, while guard tags may be of a smaller size such as 4 bits and so an access to update or read the guard tag for a given memory location could act at a smaller granularity of 4 bits say (although it may also be possible to read or write a block of guard tags for a range of associated data addresses in a single memory transaction).

The apparatus may have one or more caches which can cache guard tags read from the guard tag storage locations. These could include dedicated guard tag caches not also used for data/instructions, or could be a unified cache which can be used both for guard tags and for at least one of data and instructions. If one software process updates a guard tag for a given location then it may be useful to ensure that other processes accessing the corresponding block of memory have their tag checks performed based on the updated value. If guard tags are cached, following a guard tag update it is possible that there may still be some out of date guard tag values resident in the caches. Therefore, a coherence scheme may be used to maintain coherence of guard tags cached in at least one cache.

In some examples a hardware coherence scheme may be provided. The apparatus may have hardware coherence management circuitry which maintains coherence of guard tags cached in the caches without explicit software involvement. For example the hardware coherence management circuitry may use a coherency protocol to track coherency states of guard tags stored in various caches and certain requests to read or update guard tags may trigger changes in coherency state at other caches, for example based on snoop requests and responses exchanged by the caches and the coherence management circuitry. For example, an update to a guard tag for a given data address may cause other cached copies of the guard tag to be invalidated. This may be similar to any known coherency protocol applied to data accesses. The hardware coherence management circuitry could also be used to maintain coherence of data other than guard tags cached in at least one cache.

Another approach can be that the processing circuitry of the apparatus supports a software coherence scheme to maintain coherence of guard tags cached in at least one cache. This avoids the cost of supporting a hardware coherence scheme. For example, the processing circuitry may support at least one type of tag cache maintenance operation requestable by software to trigger cleaning or invalidation of guard tags cached in at least one cache, and rather than having hardware which can automatically monitor activity related to guard tags to ensure that out of date copies of guard tags are invalidated or updated, instead the responsibility to maintain coherence of guard tags may lie with software so that when software is changing guard tags for a given region it can request a cache maintenance operation to trigger cleaning or invalidation of guard tags cached in one or more caches.

Another approach can be that the hardware coherence scheme may be provided to manage coherence of guard tags or data so that tag accesses to the same address of a guard tag storage location return coherent values even if it is possible for multiple caches in the system to cache those values, but in addition there may be support for a software coherency scheme to allow software to trigger additional coherence maintenance operations beyond those enforced in hardware. For example, the processing circuitry may support at least one type of tag cache maintenance operation requestable by software to trigger invalidation of guard tags cached in at least one cache. This could be useful, for example, when the mapping information defining the mapping of guard tag storage locations is changed, so that some addresses in memory previously used for data storage locations are reallocated as guard tag storage locations, or vice versa. A hardware coherency scheme may not be able to detect that the purpose of the storage location has changed, and may simply attempt to ensure that subsequent accesses to a given address of storage access the most recently written data value for that address, but this could risk stale data in caches being misinterpreted as guard tags after the reconfiguration of the mapping information, or could risk exposing as data information on the guard tag values set for particular memory regions. Therefore, it can be useful to provide support for software coherence maintenance operations that can be executed after changing the mapping information, to trigger additional invalidations from caches capable of caching tags, that would not be enforced automatically by hardware.

Where a software coherency scheme is supported, the tag cache maintenance operation requestable by software could be a CPU instruction supported in the instruction set architecture of the processing circuitry, or could be a memory-mapped operation implemented by performing a store operation to store data to an address mapped to the software coherence operation so that when a store to that address is carried out then this is interpreted as triggering the cache maintenance operation, with parameters of the cache maintenance operation determined by the store data associated with the store instruction.

The memory access circuitry may determine, according to the programmable mapping, whether a given memory location other than a guard tag storage location is a tagged location associated with a corresponding guard tag storage location or an untagged location not having a corresponding guard tag storage location. When a tag-guarded memory access operation is performed to a tagged location in memory then the guard tag in the corresponding guard tag storage location can be used to carry out the tag check comparing the address tag of the target address with the guard tag and the indication of whether the match is detected is generated. However, for an untagged location, when the tag-guarded memory access operation identifies an addressed location which is determined based on the programmable mapping to be an untagged location, the memory access circuitry can respond in different ways. For example, in this scenario the memory access circuitry could generate an error indication, or could simply treat the address location as being associated with a guard tag having a certain default value. Hence, the programmable mapping does not need to specify guard tag storage locations for the entire memory address space, and it is acceptable to leave some locations untagged which do not have a corresponding guard tag storage location. By supporting some locations being untagged locations, this can reduce the cost of implementing the configuration mechanisms for configuring the programmable mapping, recognising that software may in many cases not require guard tags to be configured for some blocks of memory.

In some implementations of the programmable mapping, the programmable aspect of the mapping of guard tag storage locations may be merely in the definition of which addressable locations in memory are tagged and which locations are untagged, so that for any given addressed location if it is identified as a tag location then there may be a fixed mapping of the data address to the address corresponding guard tag storage location. This approach may be relatively simple to implement as it does not require much mapping information to be stored to indicate the programmable mapping. For example, a single bit per region of the physical address could be enough to identify whether each region is tagged or untagged, and it may be implicit that if a region is tagged then its guard tags are stored at a designated region of the address space (e.g. a sub-portion of the region itself, or at a particular offset within a designated guard tag storage region).

However, in other examples there may be a more flexible implementation of the programmable mapping, which enables a variable mapping between the address of a given memory location and an address of the corresponding guard tag storage location. This can provide more flexibility to vary the relative location of the guard tag storage locations within the address space. This may be useful for software in some examples, for example to reduce the extent to which blocks of data addresses are fragmented by intervening guard tag storage locations.

In some examples the same configuration mechanism can be used to configure the programmable mapping for the entire address space used to access data in memory. This approach may be simpler to configure by software for example.

However, it is also possible that different configuration mechanisms could be used for different portions of the address space. This may be useful to increase the flexibility for hardware system designers to combine a number of distinct off-the-shelf memory storage units which may have been provided with different configuration mechanisms for configuring whether memory storage capacity is allocated for data/instructions or guard tags. Hence, in one example: for a first portion of an address space, the programmable mapping is configured according to a first configuration mechanism; and for a second portion of the address space, the programmable mapping is configured according to a second configuration mechanism different to the first configuration mechanism. Therefore, it is not essential to use the same configuration mechanism across the entire address space.

Many different configuration mechanisms are possible for configuring the programmable mapping. Some examples are discussed below.

In one example of a configuration mechanism: for at least one portion of an address space, the memory access circuitry is configured to determine the mapping of guard tag storage locations based on tagged/untagged indicators each corresponding to a corresponding region of the at least one portion and indicating whether the corresponding region is a tagged region or an untagged region; and for a given region indicated as a tagged region, the guard tags associated with memory locations with addresses in the given region are stored in guard tag storage locations having addresses in a designated guard tag storage region of the address space corresponding to the given region. As mentioned above, with this approach the location of the designated guard tag storage region corresponding to a given region indicated as a tagged region could be fixed and non-programmable, so in this case the programmable nature of the mapping is simply the setting of the tags/untagged indicators which indicate each region as tagged or untagged. This implicitly varies the size of the total amount of storage allocated for guard tag storage locations, because if a particular region is not indicated as a tagged region then the corresponding designated guard tag storage region can be reallocated for use in storing regular data. This can be enough to permit system designers to make better use of the available storage capacity in memory since it is not necessary to allocate a large amount of guard tag storage if software will not use it, but this enables a relatively simple form of mapping information to be implemented.

Another example of a configuration mechanism may be where, for at least one portion of an address space, the memory access circuitry is configured to determine the mapping of guard tag storage locations based on a programmable base address indicative of a start of a guard tag storage region of address space allocated for the guard tag storage locations. This approach may be more flexible in that the guard tag storage region could be mapped to different portions of the address space depending on the desired use of memory by software, by varying the programmable base address set for the guard tag storage region. This may be helpful for example to avoid the location of the guard tag storage region conflicting with physical address allocations expected by certain software executing on the processing apparatus.

When there is a guard tag storage region identified using a programmable base address, different approaches may be used to identify which location within the guard tag storage location stores the guard tag for a particular data address. In some cases, for a tagged block of memory locations having an associated guard tag storage location, an offset of an address of the associated guard tag storage location relative to the programmable base address of the guard tag storage region could be non-programmable, so that there is a fixed offset within the guard tag storage region allocated for each data address granule in the at least one portion of the address space. This approach can again simplify the mapping information since the mapping table could simply identify granules of data addresses as either untagged or tagged and if they are tagged then the corresponding guard tag may be at a certain offset relative to the programmable base address with the offset being derived from the granule address of the corresponding granule of data address space. This approach avoids the need to store a programmable offset value for each granule, but may sometimes result in less efficient use of the guard tag storage regions since it may be difficult to reclaim the space allocated at the locations within the guard tag storage region corresponding to any untagged data locations, as these locations may be fragmented across the guard tag storage region interspersed with locations that are being used to store guard tags.

In another approach, for a tagged block of memory locations having an associated guard tag storage location, an offset of an address of the associated guard tag storage location relative to the programmable base address of the guard tag storage region could be variably defined by the programmable mapping information. For example there may be a table of index values with each index corresponding to a given granule of data addresses and indicating the location within the guard tag storage region (relative to the base address) at which the granules associated guard tag is stored. This approach could allow the guard tags associated with the tagged blocks of memory locations to be compressed into a smaller size since it is not necessary to leave gaps in the guard tag storage region corresponding to the untagged granules.

In another example of a configuration mechanism, for at least one portion of an address space, the memory access circuitry is configured to determine the mapping of guard tag storage locations based on a plurality of sets of programmable range configuration information, each set of programmable range configuration information for specifying a range of addresses designated for tagged memory locations and specifying a guard tag storage region of address space designated for the guard tag storage locations associated with the tagged memory locations. This approach could help to reduce the amount of mapping information used to implement the programmable mapping, while still supporting a reasonable amount of flexibility in the locations at which guard tags are stored and/or the addresses of tagged memory locations which are defined with corresponding guard tag storage locations. For example the programmable range configuration information may define the ranges of the memory locations which are designated as tagged memory locations and the memory access circuitry may treat, as an untagged location not having an associated guard tag storage region, a memory location which has an address in a portion of the address space that lies outside any of the valid ranges defined by the sets of programmable range configuration information. This approach can avoid a need to maintain a mapping table with a per-granule entry for each granule of address space, as it is not necessary to explicitly define configuration information corresponding to untagged ranges of addresses, so this can reduce the total volume of mapping data. Specifying ranges using a start and end address (or start address and size) can help to reduce the total number of mapping entries compared to configuration mechanisms which provide per-granule state associated with address granules of a certain power-of-2 address block size.

Another configuration mechanism that could be used for configuring the programmable mapping may be to use a hierarchical mapping structure which comprises multiple levels of mapping table. When determining the mapping of the guard tag storage locations the memory access circuitry can identify an address of a guard tag storage location corresponding to a given memory location by performing a table walk through the hierarchical mapping structure based on an address of the given memory location for which the corresponding guard tag storage location is to be identified. This may be similar to the way in which hierarchical page table structures are walked based on a virtual address to identify address mapping information used to translate the virtual address into a physical address for example. Using a hierarchical structure has the benefit of enabling much greater flexibility in the mappings of guard tag storage locations and the parts of the address space allocated for entries of the mapping structure, but may be more complex to implement in hardware circuitry.

Again, as described earlier the programmable guard tag mapping features described above can also be supported in a computer program which control the host data processing apparatus to provide an instruction execution environment for emulating the architecture of a known data processing system. The computer program may have processing program logic, memory access program logic corresponding to the processing circuitry and memory access circuitry described above, and can be implemented using similar techniques to those described above with respect to FIG. 12.

SPECIFIC EXAMPLES

There is a desire across all market segments for stronger memory protection and/or detection of memory usage errors in systems. Tagging systems such as the one described above implement architecture to assist with these goals. They provide 4 features:
  An in-memory guard tag associated with each small granule of data locations;
  CPU instructions to write (and read) in-memory tags;
  A hardware check applied on data accesses that the in-memory tag matches a tag in the address used to make the access;
  A report of any mismatch, optional prevention of writes to the location and an optional CPU exception.

Tagging systems need storage for the in-memory tags which may be provided in two fundamental ways:
1. Tags stored as data in regular byte data storage locations, accessed using regular load/store instructions, with a mechanism to translate the data address to the tag address
2. Tags stored as metadata in logically separate memory locations to data locations, with architecturally separate mechanisms for accessing guard tags in memory compared to those provided for accessing data locations.
Each comes with its benefits and drawbacks:
  In a 'tags as data' system CPUs can provide configurable storage for the tags using an existing MMU based translation system. Unfortunately this approach can add difficult to hide overheads to load and store instructions by increasing pressure on translation and data caches and so may be unsuitable to certain usage patterns.
  In a 'tags as metadata' system the storage for tags is permanently allocated either as explicit tagged-DRAM or as a permanent 'carve-out' from a section of data DRAM. In systems where tags are not always, or not extensively, used this can add significantly to system cost.

The examples below provide mechanisms to support dynamic allocation of storage for in-memory tags in a tags as metadata system, implementing mapping of data addresses to tag addresses near system memory.
The mechanism defines
  granules of data storage which may be 'tagged' or 'untagged';
  granules may be uniform or may vary from location to location, and over time, by software configuration or system design;
  granules of tag storage sufficient to hold the tags for an associated data granule;
  configurable mappings between data granule addresses and tag granule addresses, where each mapping defines:
    whether there is a mapping between data locations and tag locations, or data locations are untagged;
    if there is a mapping, which storage locations are used to store tags (optional).
  the number of bits allocated to a tag is implementation defined;
  the number of data locations associated with a tag is implementation defined.
If a data storage granule is configured as untagged, operations on those locations that expect tags may
  treat the tag as a pre-defined value e.g. 0, and/or
  cause an error to be reported.
There may be more than one range of data locations in a system. Each range may:
  have its own configuration mechanism;
  share a mechanism with other ranges;
  have a fixed mapping from data storage locations to tag storage locations; or
  be untagged.
If caches exist above the mapping that can hold storage used for tags or data, then the mechanism provides one of:
  cache maintenance operations to clean and/or invalidate cache contents to the storage locations
  hardware coherency of those locations to achieve the same.
Any cache maintenance operations may be provided as CPU instructions, memory mapped operations, or some other mechanism and may act on:
  caches as a whole;
  an index or range of indices in the caching structure;
  a suitable address or range of addresses that can be decoded by the CPU and/or memory system to identify the ranges of locations that must be made coherent.
There are many ways that the mapping between data granules and tag granules can be described including but not limited to
  a linear array, with one entry per tag granule
  a linear array of ranges of granules (including a single range)
  hierarchical tables similar to those defined by table based CPU memory management units
  a hash table of recently used mappings, with software replacement as necessary Example Systems In each of the following, for sake of example, a tag is 4 bits and is associated with a 16-byte granule of memory. However, It is possible to implement other tag sizes or granule sizes.

Example 1

A table of mappings from 1 GB data granules to 32 Kb tag granules. Each data granule is mapped to a tag granule fixed relative to a base granule. Therefore, the mapping information provides:
  a base address of tag storage, aligned to the 32 Kb tag storage granule
  A table in memory mapped registers containing a mapped/unmapped bit per data granule
  A system defined base address for CPU access to the registers

Example 2

An array of 16 mapping ranges, configurable in base addresses and size (aligned to and sized to some minimum data granule e.g. 4 Kb)
  configuration for each range of
    the base address of the data granule;
    the base of the tag granule;
    the size of the range;
    whether it represents a mapping.
  ranges of data granules not covered by configurable ranges treated as unmapped.
  range information stored in memory mapped registers at a system defined address.

Example 3

A hierarchical table of mappings from data granules to tag granules:
  each level of the table representing successively smaller granules of data (and correspondingly granules of tags);
  the first level represents a table of 1 GB data granules;
  the next level represents 2 MB data granules;
  the next level represents 4 KB data granules;
  each entry in a table may be:
    marked as unmapped, terminating translation;
    marked as invalid, causing an error;
    marked as translated, terminating the translation and providing an address for the tag storage;
    marked as a table of addresses for finer grained mapping tables (if not the finest grain).
  the highest level table is stored at a location provided in a memory mapped register;
  the table locations are initialised and updated by a CPU;
  the table contents may be cached by caching structures;
  data in caching structures may be hardware or software coherent;
  if software coherent, operations provided to:
    invalidate the whole cache;
    invalidate by a cache index;
    invalidate by range of suitable addresses;
    invalidate by suitable address.
These are just some examples of configuration mechanisms, and others are discussed below.

Further Examples

Figure 13:
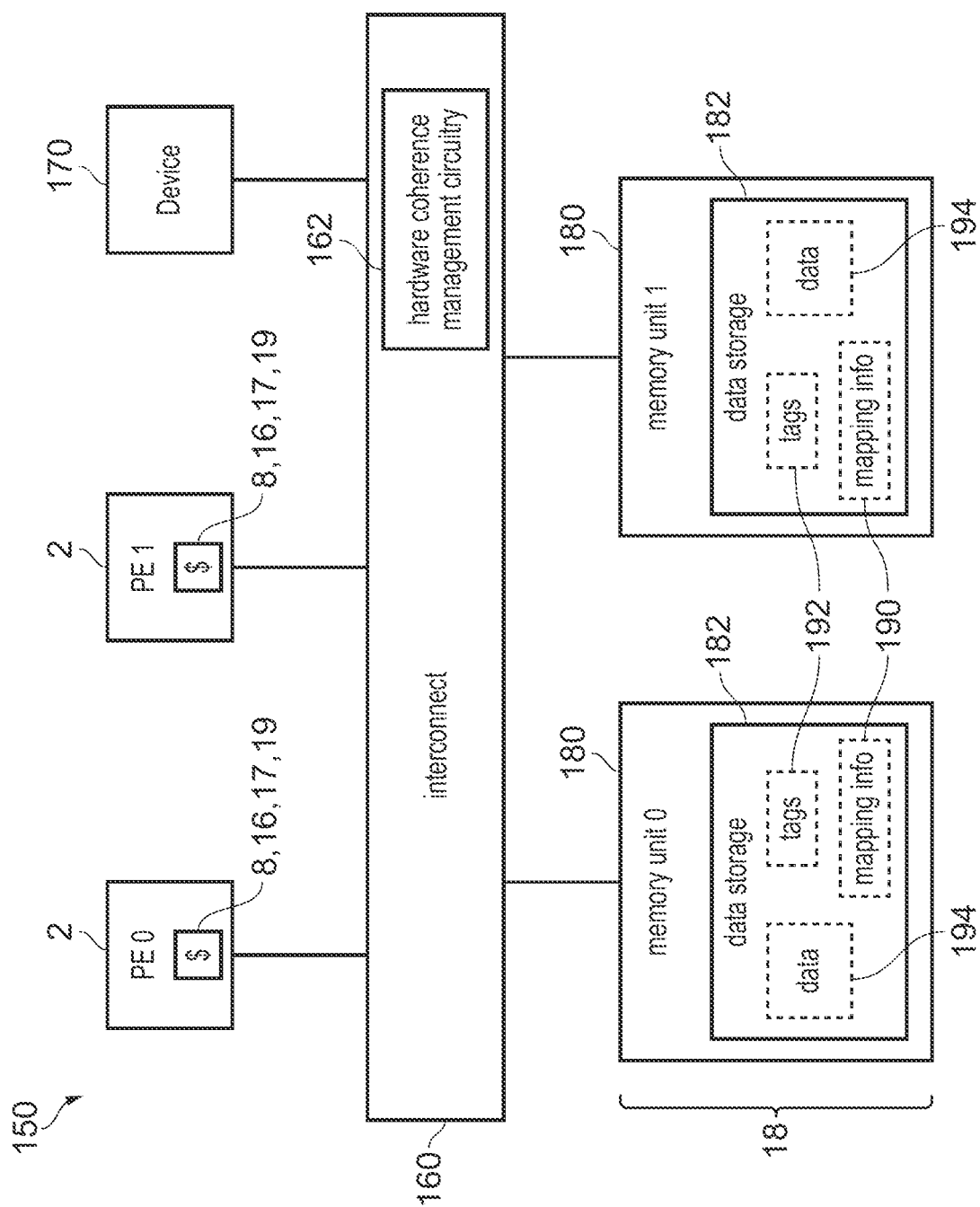
FIG. 13 illustrates a data processing system.

FIG. 13 schematically illustrates a data processing system 150 comprising a number of processing elements (PEs) 2, each of which may comprise the components shown in FIG. 1 (other than the main memory 18 which is shown in FIG. 13 as separate from the PEs 2). Hence, each PE may have processing circuitry 4 and an instruction decoder 6 supporting execution of instructions according to a particular instruction set architecture, and memory access circuitry 15 for issuing access requests to access data in memory and performing tag checks as discussed above. Each PE 2 also includes one or more caches 8, 16, 17, 19 as discussed earlier. Each PE 2 may, for example, be a central processing unit (CPU), or a graphics processing unit (GPU) for example.

Access to shared memory 18 by the PEs 2 is controlled by an interconnect 160 which has hardware coherence management circuitry 162 for managing coherency of data, instructions or tags stored in caches 8, 16, 17, 19 of the PEs 2 according to a coherency protocol. The interconnect 160 also manages accesses to memory from a device 170, which could be a hardware accelerator or an input/output device for example. The shared memory 18 in this example includes several memory units 180 each having data storage circuitry 182 providing a certain amount of storage capacity. While FIG. 13 shows just two memory units for conciseness it will appreciated that other examples may have a greater number of memory units. Different memory units could use the same memory storage technology (e.g. DRAM, or non-volatile storage), or include storage units of different types.

As shown in FIG. 13, the PEs 2 have access to mapping information 190 (in this example stored at addressable locations in memory 18, although in other examples it could also be provided within registers within the PEs 2 or in a memory controller not shown in FIG. 13 provided for controlling the memory unit 180). The mapping information 190 defines a variable mapping of guard tag storage locations 192 for storing guard tags for corresponding data memory locations 194. The mapping of which physical locations within the data storage 182 of the memory units 180 are allocated for the tag storage locations 192 is variable so that it is possible to adjust the overall size of the tag storage regions 192 provided for tags and any portions of the data storage 182 not currently being defined by the mapping information 190 as being used for tags 192 may be reused to provide additional data storage locations 194. Hence, the partitioning of the data storage 182 between tags 192 and data 194 is variable. This means that even if the software executing on the PEs 2 does not make significant use of tag checking, there is no need to unnecessarily reserve a fixed portion of the data storage 182 of the memory units 180 for the tags and the greater storage capacity can be left available for data.

As mentioned earlier, guard tags may be cached in one or more caches within the data processing system 150, such as in the dedicated tag cache 19 as shown in FIG. 1, or within the regular data caches 16, 17 of a PE 2. Also, guard tags could be cached within a shared cache of the interconnect 160 which is shared between PEs 2, or within other caches closer to the memory units 18, which could be either dedicated for tags only or could be shared for both data and tags.

The hardware coherence management circuitry 162 is provided to manage coherency for data accesses corresponding to addresses within the data storage regions 194 of memory 18. When one PE 2 issues a request to access a particular address then the hardware coherence management circuitry 162 may snoop caches at other PEs 2 to check coherency status or trigger a change of coherency status (such as an invalidation of data from a cache if the requesting PE is going to overwrite the data), and responses to such snoops may inform how the hardware coherence management circuitry 162 handles requests. Any known coherency protocol can be used for this. The hardware coherency management circuitry 162 could also apply the coherency protocol during guard tag read/write operations for reading or setting guard tags, so that accesses to guard tags are also hardware coherent.

However, the PEs 2 may also support a software coherence scheme to allow software to trigger additional cleaning or invalidation of cached tags within caches. The instruction set architecture of the processing circuitry 4 and instruction decoder 6 within the PEs 2 may support at least one type of tag cache maintenance operation which is requestable by software to trigger cleaning or invalidation of guard tags cached in at least one cache. For example, the tag cache maintenance operation could be a tag cache CPU instruction which can specify a target address or a target address range and which causes the guard tags associated with that address (or address range) to be cleaned (written back) or invalidated from at least one cache. Alternatively, the cache maintenance operation could be implemented as a memory-mapped operation where a write to a particular memory address causes the cache maintenance operation to be performed. Either way, parameters of the cache maintenance operation could specify whether the guard tags should be invalidated or cleaned, which subset of caches should be flushed or cleaned of guard tags, and other parameters for controlling the cache maintenance operation. By providing architectural support for a tag cache maintenance operation which software can use to trigger invalidations or cleaning of guard tags to maintain coherency of guard tags, this helps with avoiding errors or leakage of guard tag information after the mapping information 190 for setting the mapping of guard tag storage locations is changed. When the mapping information 190 changes and addresses previously allocated as data storage locations are changed to be guard tag storage locations, the caches 16, 17, 19 could still be storing stale data for those addresses, and the protocol implemented by the hardware coherence management circuitry 162 may tend to preserve the most recently updated value of the data at those addresses. This means that after the mapping information update, there could be a risk of stale data still in caches being incorrectly interpreted as guard tags, which could cause guard tag checking errors. Similarly, if the update to the mapping information 190 causes guard tag storage locations to be remapped to become data storage locations, there could be a risk of exposing information about guard tag allocations to software that has access to the newly mapped data locations, which may be undesirable. To avoid these problems, software can perform cache maintenance operations just after updating the mapping information, with the cache maintenance operations specifying the addresses whose mapping as data storage locations or guard tag storage locations has changed, to trigger invalidation of values held in caches 16, 17, 19 for those addresses.

As mentioned above, the processing circuitry 4 and instruction decoder 6 may support at least one type of guard tag setting instruction for setting guard tags associated with one or more address locations in memory to a particular value. For example this could be for multiple tag setting instruction described earlier or could be an instruction for setting a guard tag associated with a single address. These instructions could be distinct from regular load/store instructions for accessing data locations 194 in memory. Hence, the guard tag setting instruction(s) can be different instructions of the instruction set architecture compared to non-guard-tag-setting store instructions for storing data in a memory location other than the guard tag storage locations. There could also be at least one type of guard tag setting/store instruction which both updates one or more guard tags associated with one or more memory locations and also updates the corresponding data in the one or more memory locations.

The configuration mechanism used by software to define the mapping information 190 which controls guard tag storage location mappings may vary significantly and a number of examples are discussed below with respect to FIGS. 15 to 21. It is not essential for the same configuration mechanism to be used for the entire physical address space. For example, the different memory units 180 could be provided with different configuration mechanisms so that the format of the mapping information 190 used for the part of the address space mapped to one memory unit 180 can be different to the format of the mapping information 190 used for part of the address space mapped to a different memory unit 180. This improves flexibility by supporting the ability to combine different memory devices into a single system.

In general, the mapping information 190 defines the variable mapping so that no particular storage location within the data storage 182 of a given memory unit 180 needs to be permanently allocated as tag storage. The mapping information permits the user to select whether a given address mapped to a data storage 182 should be treated as a tag storage location or a data memory location. The mapping information can also control whether a given data storage location 194 is a tagged storage location which has a corresponding guard tag storage location in the guard tag region 192 or an untagged storage location which does not have an associated guard tag storage location. Hence, the mapping information 190 may vary how many data storage locations have corresponding tag storage locations and may vary the total combined size of the tag storage locations 192.

Optionally, in some examples the mapping information may also allow variation in which particular addresses within a physical address space are allocated as the tag storage locations 192 so that there is flexibility to assign different physical addresses within the physical address space for the tag storage locations. This can be helpful to improve compatibility with certain software or system design constraints which may require certain physical addresses to be allocated for particular purposes, so that the tagged locations can fit around the existing constraints. However, being able to vary the addresses allocated for a tag storage location associated with a particular data address is not essential and some examples may prescribe a fixed address of the tag storage location associated with a particular data address with the mapping information merely controlling whether or not a given data address is tagged or untagged and hence adjusting the overall size of the capacity allocated for tag storage.

The mapping information may be mapped to particular physical addresses in memory and access rights for reading/writing the mapping information may be controlled by the MMU 20 using access permissions defined in page table structures. For example, the access permissions set for the addresses used for the mapping information 190 may restrict read/write access to software executing with a certain level of privilege or higher (e.g. software at a least privileged execution level may not be allowed to access the mapping information 190).

Figure 14:
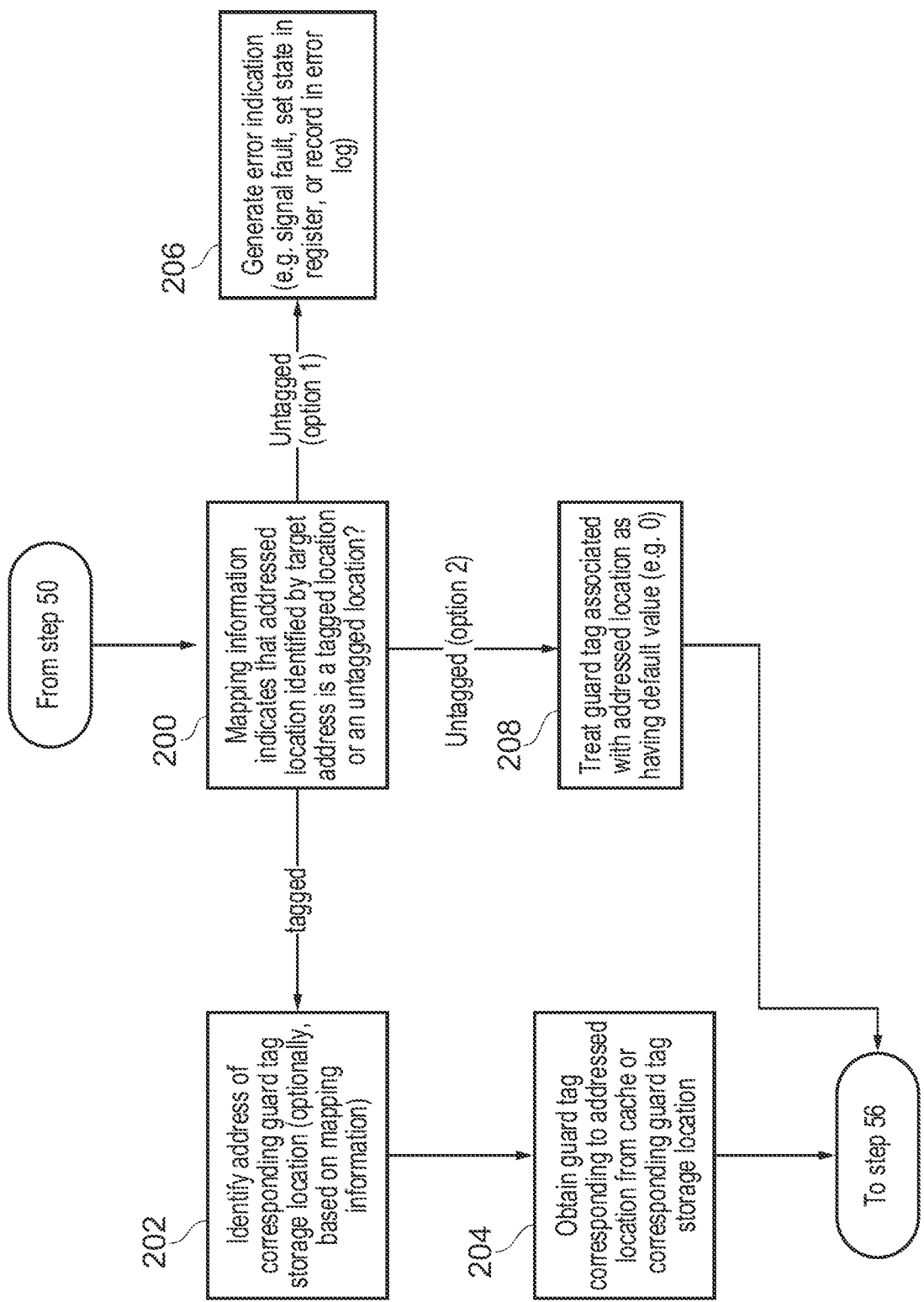
FIG. 14 is a flow diagram illustrating use of mapping information for identifying a mapping of guard tag storage locations.

FIG. 14 is a flow diagram showing in more details steps performed at step 54 of FIG. 3 for obtaining the guard tag associated with the addressed location identified by a target address of a tag-guarded memory access. Hence, the steps shown in FIG. 14 following step 50 of FIG. 3 where the tag-guarded memory access is triggered specifying the address of the addressed location.

At step 200 of FIG. 14, the memory access circuitry 15 determines whether the mapping information 190 indicates that the addressed location identified by the target address of the memory access is a tagged location or an untagged location. If the addressed location is a tagged location then at step 202 the memory access circuitry 15 identifies the address of the corresponding guard tag storage location corresponding to the address data location. In some examples (such as in FIGS. 15 and 16 discussed below) the mapping between the address of the addressed location and the address of the corresponding guard tag storage location may be fixed, independent of the mapping information. However, as discussed in the later examples of FIG. 17-21 there could also be a variable mapping between the target address of the address location and the address of the corresponding guard tag storage location, and in this case the address of the corresponding guard tag storage location may be identified at step 202 based on the mapping information 190.

At step 204, the memory access circuitry 15 obtains the guard tag corresponding to the addressed location from a cache 16, 17, 19 or from a corresponding guard tag storage location 192 in memory, based on the address identified at step 202. The method then proceeds to step 56 of FIG. 3 to compare the address tag and the guard tag as described before and continue with the method of FIG. 3.

On the other hand, if at step 200 the mapping information was determined to indicate that the addressed location identified by the target address is an untagged location which does not have a corresponding guard tag storage location, then in one option at step 206 the memory access circuitry 15 generates an error indication. Different examples could handle the error indication in different ways. For example, in some cases a fault may be signalled when the addressed location of a tag-guarded memory access is found to be an untagged location. Alternatively, some state could be set in a register which subsequent instructions could read to identify that the address location was found to be an untagged location. This could be used by the software which encountered the access to the untagged location to respond in an application-specific way. Another approach can be that the access to an untagged location can simply be recorded in an error log and need not cause any change to the operation of the software which requested the memory access itself. For example, errors in the error log may periodically be reported to a developer to assist with improving code to reduce the chance of tag errors in future. If an error indication is generated at step 206, it is optional whether or not the memory access to the addressed location still proceeds regardless of the access to the untagged location, or whether the memory access is halted when it is found that the addressed location is untagged. Also, the particular error reporting approach taken may be either fixed for a particular hardware implementation of the processing system 150, or can be variable based on configurable architectural state set by software which can configure how the hardware responds to tag checking errors such as accesses to an untagged addressed location.

FIG. 14 also shows a second option for handling accesses to untagged addressed locations. In this case, if step 200 identifies that the address location is an untagged location then at step 208 this may not necessarily be treated as an error, but instead the guard tag associated with the addressed location may be treated implicitly as having a default value, such as 0. The method then may proceed to step 56 of FIG. 3 to compare the address tag associated with the tag-guarded memory access with the guard tag set to the default value, and then at step 58 as shown in FIG. 3 described earlier, the memory access circuitry 15 generates an indication of whether a match is detected between the guard tag and the address tag. Hence, depending on the outcome of the tag check, it is still possible that an error indication could be generated, but this is not guaranteed. Supporting the option of treating untagged locations as being associated with a default value of guard tag could be useful to help reduce the amount of tag storage 192 needed since data locations which do not need a tag value other than the default value may then be implicitly treated as tagged without needing an explicitly stored guard tag in memory.

Which of options 1 or 2 at steps 206 and 208 is supported may vary from implementation to implementation. Some hardware implementations may only support one of these options. Other hardware implementations may support both and there may be architectural state defined in registers 14 of the PE 2 which software can configure to select which of steps 206 and 208 is performed when a tag-guarded memory access is found to target an untagged location.

FIGS. 15 to 21 illustrate various examples of configuration mechanisms for configuring the mapping of guard tag storage locations using the mapping information 190. Each configuration mechanism could apply to the entire physical address space or only to a certain portion of the physical address space (with other portions configured using a different configuration mechanism).

Figure 15:
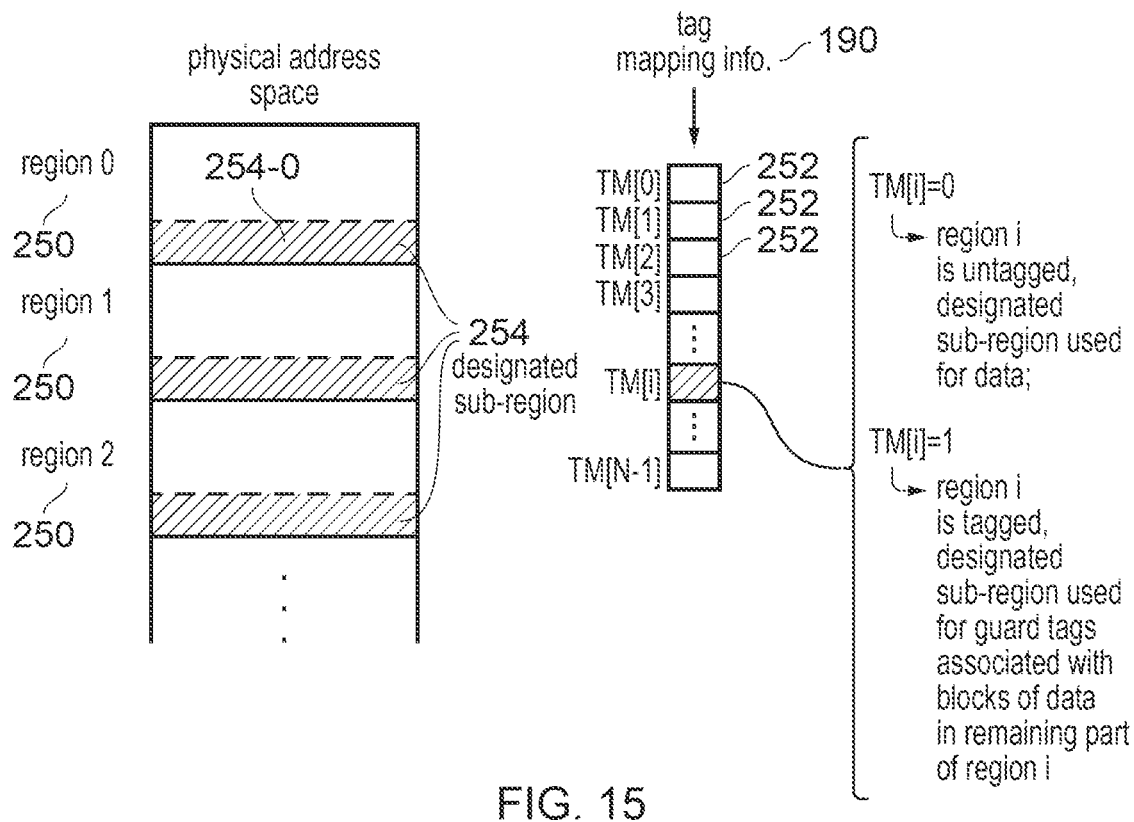
FIGS. 15 to 21 illustrate various examples of use of mapping information for defining a variable mapping in guard tag storage locations.

FIG. 15 shows a first example in which all or a portion of the physical address space is divided into a number of regions 250 and each region has a corresponding tagged/untagged indicator 252 provided within the mapping information 190. Each tagged/untagged indicator indicates whether the corresponding region 250 of the physical address space is a tagged region having an associated guard tag storage location or an untagged region which does not have any associated guard tag storage locations. When a given region 250 is indicated as a tagged region, the guard tags associated with the memory locations with addresses in the given region 250 are stored in guard tag storage locations having addresses in a designated sub-region 254 of the corresponding region 250 itself. For example, if region 0 shown in FIG. 15 is tagged then its guard tags are stored within a sub-region 254-0 within region 0 and so that sub-region is not available for use as data addresses. On the other hand, if region 0 is indicated by the corresponding tagged/untagged indicator 252 as untagged then the designated sub-region 254-0 becomes available for use as data storage. In this example, the mapping between the address of the given region 250 and the address of the corresponding designated sub-region 254 is non-programmable so that if a given region is tagged then the location of its guard tags is fixed relative to that region. Hence, in this example the mapping information 190 controls how many data storage regions are tagged, enabling software to vary how much of the address space is allocated for tags, but with a very simple format for the mapping information 180 which does not require much storage for the mapping data 190, and which can be relatively simple for hardware to manage the accesses to the sub-regions 254 making up the tag storage locations 192.

Figure 16:
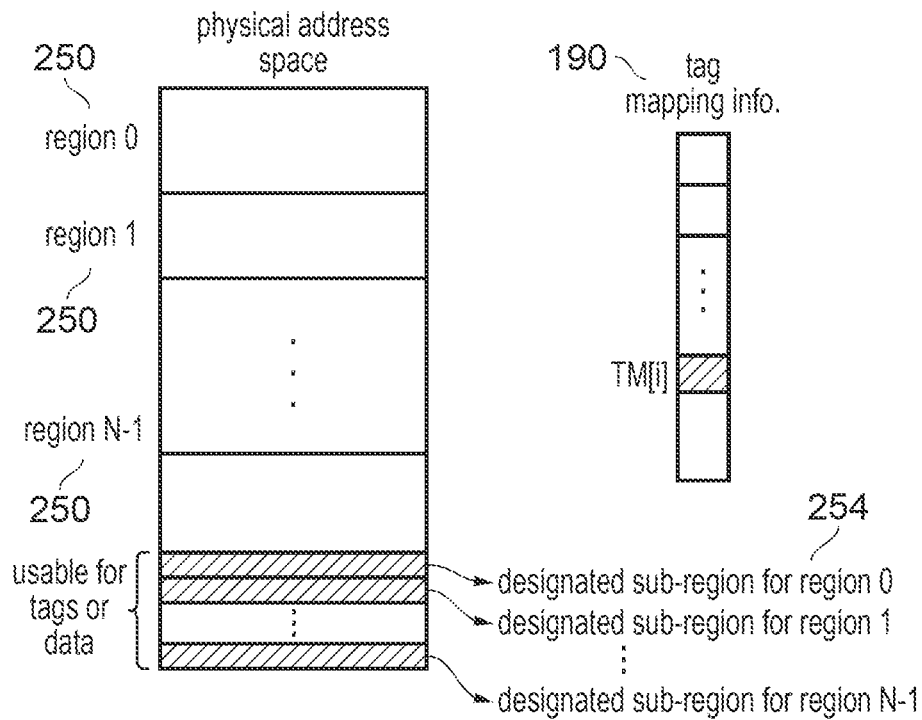

In FIG. 15, the designated guard tag storage region 254 for a given data region 250 is located at the end of the data region itself, but as shown in FIG. 15 this could mean that the data regions may end up fragmented separated by guard tag storage regions, which can be less efficient for defining page tables and for software to make use of. FIG. 16 shows an alternative in which the tag mapping information 190 is defined in the same format as in FIG. 15, but in this case the designated region 254 of the physical address space used to provide the tags for a given data storage region 250 is located in a block at the end of the physical address space rather than interleaved within the respective data regions. While this approach avoids interrupting blocks of data addresses with tag addresses, it can make it harder for software to make effective use of the reclaimed addresses associated with a given sub-region of the tag storage region 192 when the corresponding data region 250 is an untagged region. Nevertheless either of the approaches shown in FIGS. 15 and 16 are possible.

Figure 17:
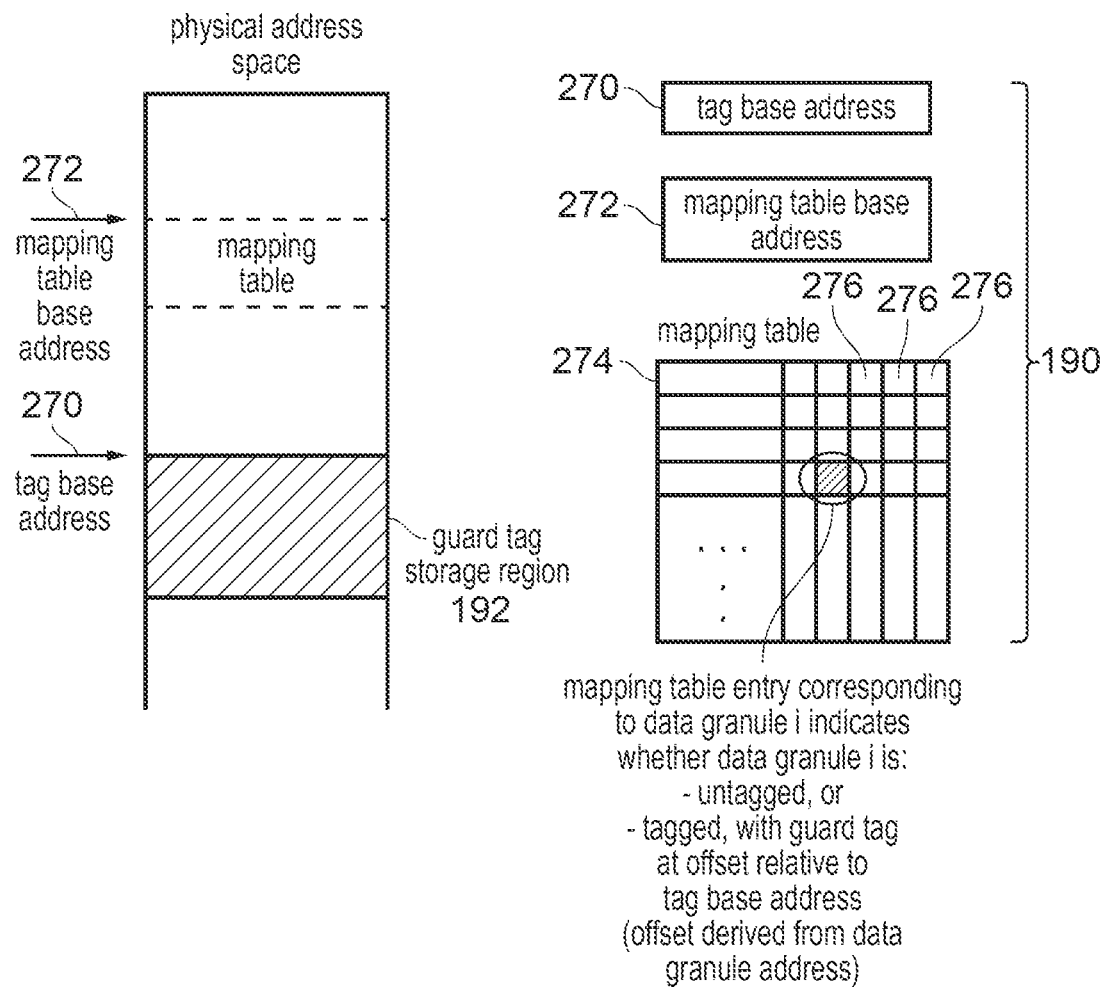

FIG. 17 shows another example of a configuration mechanism. In this configuration mechanism, as well as controlling whether data locations are tagged or untagged, a variable location of the guard tag storage region 192 of the address space is also supported. In this example the mapping information 190 includes a tag base address 270, a mapping table base address 272 and a mapping table 274 which is stored in memory at addresses identified using the mapping table base address 272. The mapping table 274 includes a set of tagged/untagged indicators 276 each corresponding to a given granule of data addresses within the physical address space. Each indicator 276 identifies whether the corresponding data granule is tagged or untagged. If untagged, the data granule has no corresponding guard tag storage location. If tagged, the address of the corresponding guard tag storage location is determined to be within a guard tag storage region 192 of the address space identified using the tag base address 270, with an offset of the corresponding guard tagged storage location for a given data granule relative to the tag base address 270 being fixed and derived from the data granule address of the given data granule. Hence, in this example the offset (relative to tag base address 270) used for the associated guard tag storage location for a particular data location is non-programmable, as the mapping indicators 276 are flags indicating tagged/untagged status. Nevertheless, the definition of a programmable base address 270 for the tag storage region 192 enables the system software to move the tag storage region to different locations in the address space to fit with addresses allocated for other purposes. Similarly there is flexibility to vary the addresses allocated for the mapping table 274 based on the mapping table base address 272.

Figure 18:
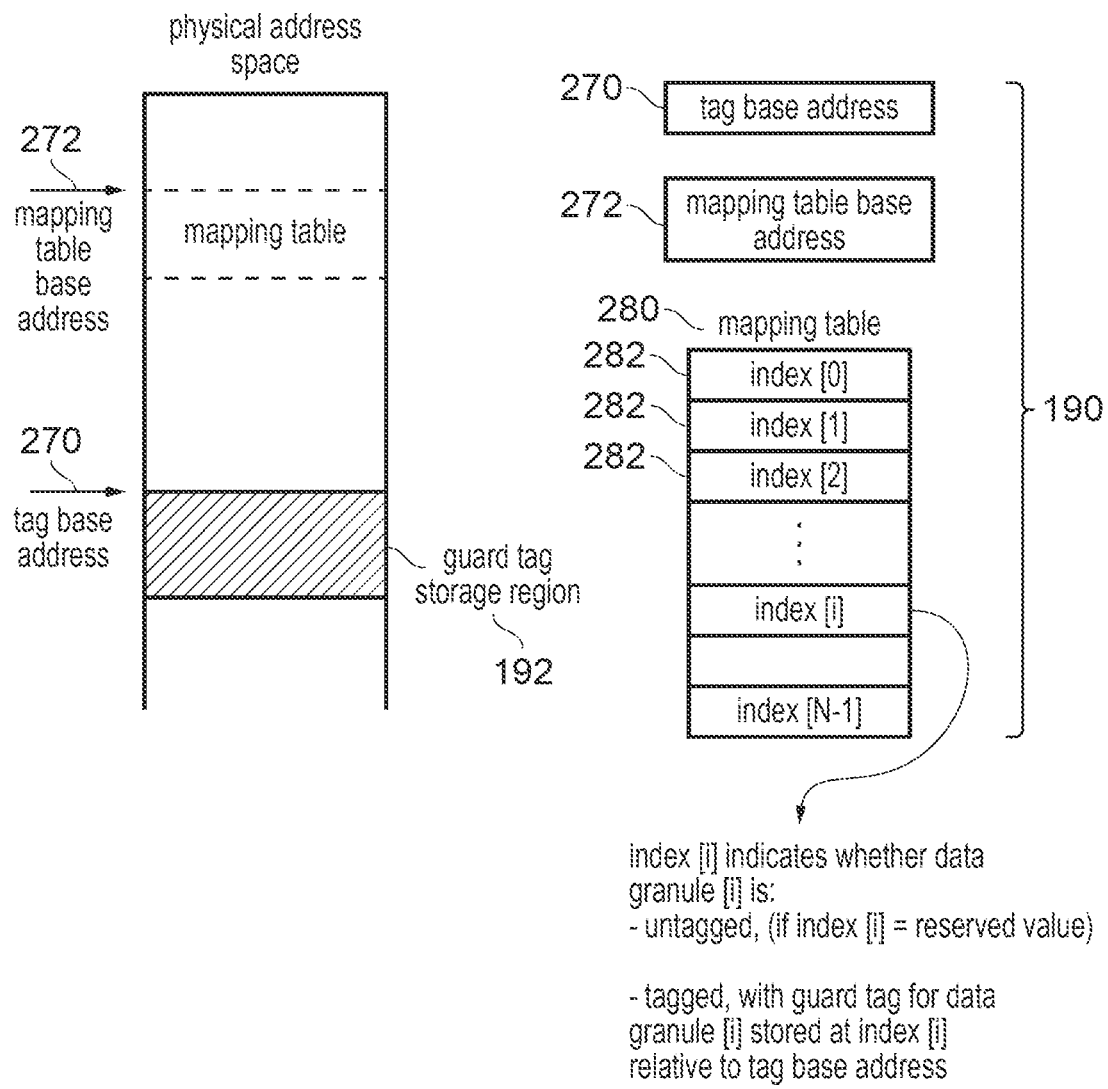

FIG. 18 shows another example of a configuration mechanism where, similar to FIG. 17, the mapping information 190 again identifies a tag base address 270 identifying the base address of the guard tag storage region 192 of the address space and a mapping table base address 272 identifying the base address of a region allocated for the mapping table 280, but in this example the mapping table 280 defines a set of index values 282 corresponding to respective data granules of addresses, rather than tagged/untagged indicators 276 as shown in FIG. 17. If an index value 282 corresponding to a given data granule has a particular reserved value or default value (such as 0 or the maximum possible index value) then the corresponding data granule of addresses may be treated as untagged storage locations which do not have corresponding guard tag storage locations defined. However, if the index value 282 for a given data granule has a different value other than the reserved value, then the index value in the mapping table 280 may indicate the offset of the guard tag storage location corresponding to that data granule relative to a tag base address 270 of the guard tag storage region 192. Hence, in this example the offset of an address of the associated guard tag storage location relative to the programmable base address 270 of the guard tag storage region is programmable and variably defined by the programmable mapping table 280. Compared to FIG. 17, this approach can help reduce the overall size of the guard tag storage region 192 since it is not necessary to leave gaps in the guard tag storage region for the untagged data granules as the offsets used for each data granule are no longer fixed and so the index values can be set so that the guard tag storage locations corresponding to the tagged granules can be stored at contiguous regions in memory without gaps. However, the approach of FIG. 18 may use more mapping data as each index value may be larger than the corresponding tagged/untagged indicator shown in FIG. 17.

Figure 19:
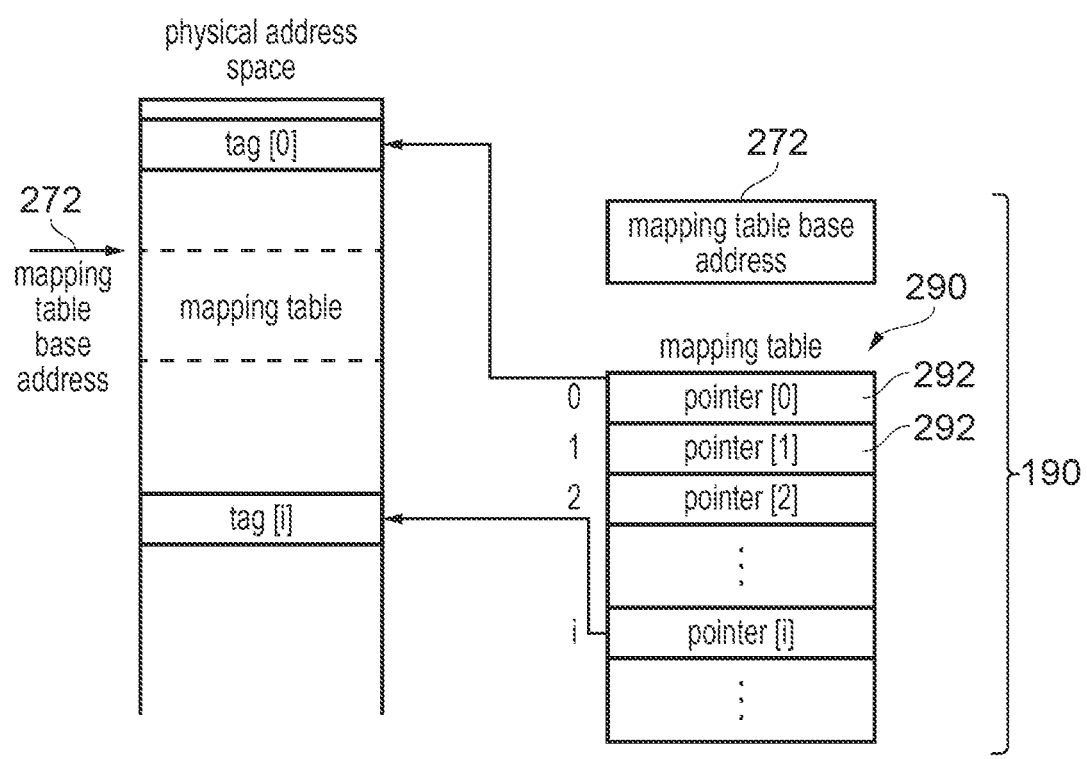

FIG. 19 shows another example configuration mechanism in which again the mapping information 190 includes a mapping table base address 272 identifying the location in the physical address space of a mapping table 290. However, in this example the guard tag storage locations are not restricted to be within a particular storage region of a physical address space, but are free to be defined anywhere within the physical address space. Hence, this time there is no tag base address 270 defined, and instead the mapping table 290 comprises a set of pointers 292 each corresponding to a particular data granule and identifying the corresponding guard tag storage location within the physical address space. This may provide even greater flexibility to vary the addresses used to identify the guard tag storage locations, but may require a larger mapping table and more complex hardware circuitry to locate the guard tags for a given data access.

Figure 20:
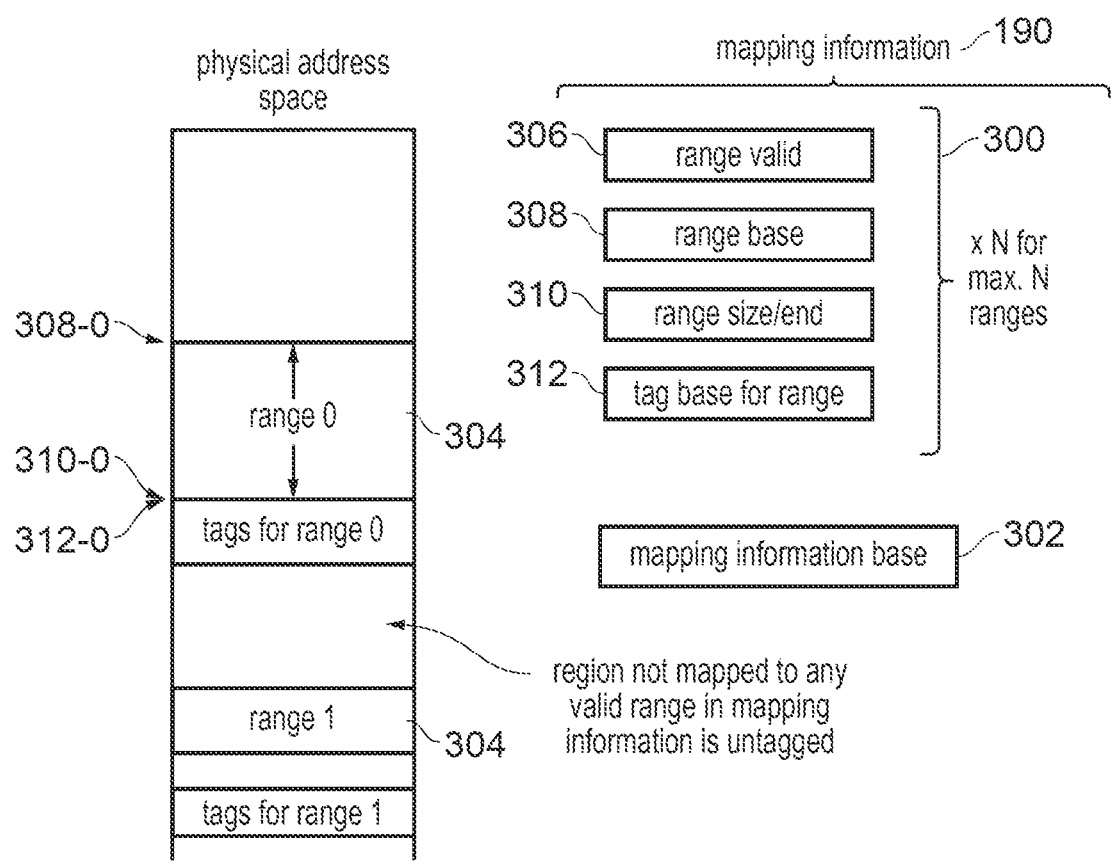

FIG. 20 shows a further example of a configuration mechanism, which defines as the mapping information 190 a number of sets of programmable range configuration information 300, of which one set is shown in FIG. 20m but it will be understood that a given implementation may support defining a certain number N of sets 300 of mapping information 190. In some examples, the sets of range information 300 could be defined in registers within a PE 2. For example some architectural registers may be allocated for defining the range information. Alternatively, there could be some memory mapped registers within a given memory unit 180 which define the range information and are accessible using load/store operations specifying an address mapped to those memory mapped registers. Alternatively, range information may be allocated at a variable address in memory with a mapping information base address 302 being defined as part of the mapping information 190 to identify the addresses where the corresponding sets of range information 300 are defined.

Each set of range configuration information 300 may correspond to a given range 304 of addresses within the physical address space. Each set of configuration information may include a range valid indication 306 which specifies whether the range information defined in a given set 300 of range configuration information is valid (software may not always wish to define the maximum number N of ranges and so can set the range valid indication 306 to invalid for those range configuration entries 300 not currently being used). Also, the range configuration information specifies, for a given range 304, a base address 308 of the range and a range size parameter 310 which may either specify the size of the range or may specify an end address of the range (in other words the end address parameter 310 can be defined either as an absolute address or as a relative address relative to the base address). Each set of configuration information also identifies a tag base address 312 for identifying the base address of a tag storage region corresponding to the corresponding range of data addresses. Hence, for range 0 shown in FIG. 20, when the corresponding range information is valid then the base address 308-0 and end 310-0 of range 0 are defined by parameters 308, 310 of the corresponding set of range configuration information 300, and this identifies all the data addresses within that range as being tagged locations, and the corresponding tag storage region starts at a base address 312-0 as defined by the set of range configuration information. Although FIG. 20 shows the tag storage region for range 0 being contiguous with the data locations of range 0, as shown for range 1 this is not essential and the tag region can be discontiguous from the corresponding data range.

For any data addresses which do not correspond to any valid range defined by the sets of programmable range configuration information 300, those data addresses are treated as untagged locations.

This format of the mapping information 190 can allow considerable flexibility of the mapping of which data locations are tagged or untagged and the locations of the corresponding tag storage locations, with relatively little mapping information 190 defined compared to the earlier options which require per-data-granule mapping state. However, it may need additional hardware circuit logic to compare addresses of memory accesses with the range information 308, 310 in valid sets of configuration information 300.

Figure 21:
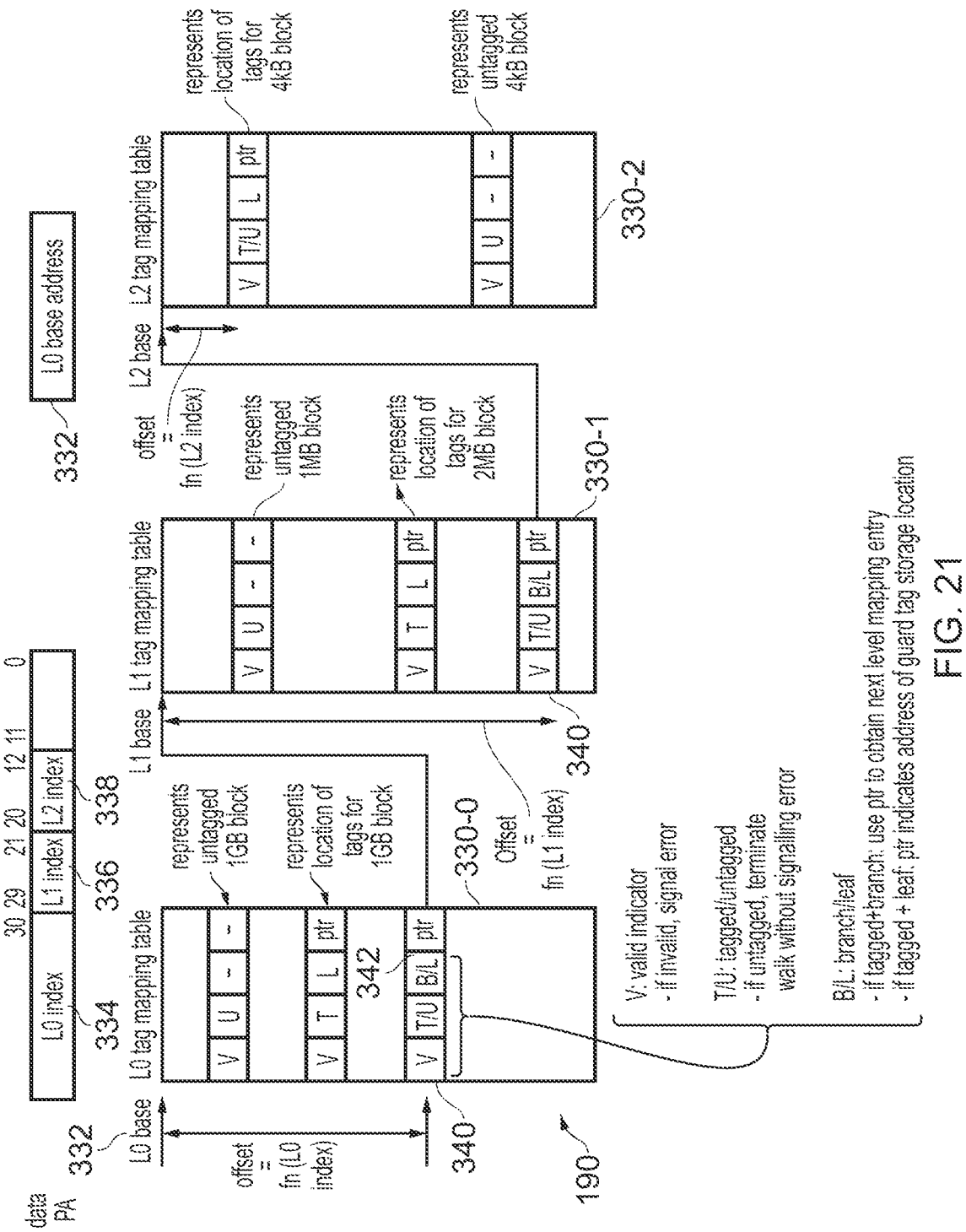

FIG. 21 shows another example of a configuration mechanism which could be used for part of the physical address space to define the mapping of tagged locations. In this example, a hierarchical mapping structure is provided as the mapping information 190 where the hierarchical mapping structure includes a number of levels of mapping tables 330, e.g. in this example level 0, level 1 and level 2 tables. This is similar to the way in which page tables are defined using a hierarchical structure for address translation. The mapping tables 330 are stored in the memory system within the data region 194 of memory. The mapping information may specify a mapping table base address 332 which identifies the base address of a level 0 tag mapping table 330-0 and when a memory access to a particular target physical address is required, a level 0 index portion 334 of the target physical address is used to derive an offset relative to the level 0 base address 332 to select a particular entry 340 from the level 0 tag mapping table 330-0. Each entry in the level 0 tag mapping table may have a valid indicator V, a tagged/untagged indicator T/U, a branch/leaf indicator B/L and a pointer field 342. If on accessing the level 0 tag mapping entry 340, the valid indicator V indicates that the entry is invalid then an error may be signalled (or an error may be recorded in an error log, similar to the way in which tag checking errors are recorded).

If the entry 340 is valid then the tagged/untagged indicator T/U indicates whether the corresponding address is tagged or untagged, and if indicated as untagged then the walk of the hierarchal tag mapping table 190 may terminate and the memory access is handled according to the way in which accesses to untagged locations are handled as shown in steps 206 or 208 of FIG. 14.

If the entry 340 indicates that the corresponding address is tagged then if the branch/leaf indicator B/L indicates that this is a leaf entry then the pointer field 342 indicates the address of the corresponding guard tag storage location, while if the entry 340 is a branch entry then the pointer 342 provides the base address of the next-level mapping table (level 1 in this instance) which can be used to obtain the next level mapping entry.

Similarly, at the level 1 table the offset of the relevant entry for the target address (relative to the level 1 base address) is derived from a level 1 index portion 236 of the physical address, and the entry 240 at that offset within the level 1 table is accessed and interpreted in a similar way to the level 0 entry. Hence, at level 1, the walk of the table can either terminate on identifying an untagged region, terminate due to identifying an invalid region which has not had any mapping data defined, or terminate because the entry is a leaf entry providing the address of a guard tag storage location for a corresponding block of memory, or alternatively if the entry accessed in the level 1 table indicates a valid branch entry for tagged regions in memory, the pointer 342 is used to identifying the location of the next level (level 2) table. This continues similarly for the level 2 tag mapping table (or any further tag mapping tables if more than 3 levels are provided) until finally the end of the walk is reached and either the block is determined to be untagged or the location of the corresponding guard tag storage location can be identified.

Hence, this approach has the flexibility to allow certain large blocks of memory to be defined having a common tag mapping using one of the higher mapping tables (e.g. each level 0 entry may correspond to a 1 GB block, and each level 1 entry may correspond to a 2 MB block) while finer-grained mappings can also be defined by using the lower tables such as the level 2 table where each entry corresponds to a 4 KB block of addresses. This approach offers considerable flexibility in defining the mappings and the location of the mapping table data itself, allowing the tables to be distributed across different non-contiguous blocks of memory to fit better with patterns of other memory allocations. However, it may need additional hardware associated with the memory access circuitry 15 for controlling walks of the hierarchical structure for obtaining tags.

Further examples are set out in the following clauses:

1. An apparatus comprising:
    memory access circuitry to perform a tag-guarded memory access operation in response to a target address, the tag-guarded memory access operation comprising:
        comparing an address tag associated with the target address with a guard tag stored in a memory system in association with a block of one or more memory locations comprising an addressed location identified by the target address; and
        generating an indication of whether a match is detected between the guard tag and the address tag; and
    an instruction decoder to decode a multiple guard tag setting instruction to control the memory access circuitry to trigger at least one memory access to update the guard tags associated with at least two consecutive blocks of one or more memory locations.
2. The apparatus according to clause 1, in which the tag-guarded memory access operation comprises controlling whether a memory access to the addressed location is allowed depending on whether a match is detected between the guard tag and the address tag.
3. The apparatus according to clause 1, in which the tag-guarded memory access operation comprises performing a memory access to the addressed location irrespective of whether a match is detected between the guard tag and the address tag.
4. The apparatus according to clause 1, in which the tag-guarded memory access operation comprises signalling a fault condition when a mismatch is detected between the guard tag and the address tag.

5. The apparatus according to clause 1, in which, in the tag-guarded memory operation, the memory access circuitry is configured to determine the address tag as a function of one or more selected bits of the target address.

6. The apparatus of clause 1, in which, in the tag-guarded memory access operation, the memory access circuitry is configured to select the addressed location independent of the address tag.

7. The apparatus according to clause 1, in which:
in response to a register-length-specifying variant of the multiple guard tag setting instruction identifying a length register, the instruction decoder is configured to control:
the memory access circuitry to update the guard tags associated with a given number of consecutive blocks less than or equal to a maximum number of blocks identified by a length parameter stored in the length register; and
processing circuitry to decrement the length parameter stored in the length register by an amount proportional to the given number.

8. The apparatus according to clause 1, in which in response to an immediate-length-specifying variant of the multiple guard tag setting instruction identifying an immediate parameter, the instruction decoder is configured to control the memory access circuitry to update the guard tags associated with a number of consecutive blocks specified by the immediate parameter.

9. The apparatus according to clause 1, in which the multiple guard tag setting instruction specifies a tag update target address for identifying the at least two consecutive blocks.

10. The apparatus according to clause 9, in which the at least two consecutive blocks comprise the block comprising a memory location identified by the tag update target address and at least one subsequent block of one or more memory locations.

11. The apparatus of according to clause 9, in which:
the multiple guard tag setting instruction specifies an address register for storing an address determining value for determining a tag update target address for identifying the at least two consecutive blocks; and
in response to the multiple guard tag setting instruction, the instruction decoder is configured to control processing circuitry to increment or decrement the address determining value stored in the address register by an offset corresponding to the number of blocks of memory locations for which the guard tags are updated in response to the multiple guard tag setting instruction.

12. The apparatus according to clause 9, in which in response to the multiple guard tag setting instruction, the instruction decoder is configured to control the memory access circuitry to trigger memory accesses to update the guard tags associated with the at least two consecutive blocks to an updated tag value determined as a function of one or more selected bits of the tag update target address.

13. The apparatus according to clause 7, in which in response to the multiple guard tag setting instruction, the instruction decoder is configured to control the memory access circuitry to trigger memory accesses to update the guard tags associated with the at least two consecutive blocks to an updated tag value determined as a function of a value stored in a tag value register specified by the multiple guard tag setting instruction independent from the tag update target address.

14. The apparatus of clause 1, in which in response to a data-clearing variant of the multiple guard tag setting instruction, the instruction decoder is configured to control the memory access circuitry to trigger memory accesses for setting the data values stored in the at least two consecutive blocks of one or more memory locations to cleared values uncorrelated with previous contents of the at least two consecutive blocks.

15. The apparatus of clause 14, in which each cleared value comprises one of:
a predetermined value;
zero; and
a random value.

16. A method comprising:
performing a tag-guarded memory access operation in response to a target address, the tag-guarded memory access operation comprising:
comparing an address tag associated with the target address with a guard tag stored in a memory system in association with a block of one or more memory locations comprising an addressed location identified by the target address; and
generating an indication of whether a match is detected between the guard tag and the address tag; and
in response to decoding of a multiple guard tag setting instruction, triggering at least one memory access to update the guard tags associated with at least two consecutive blocks of one or more memory locations.

17. A non-transitory storage medium storing a computer program for controlling a host data processing apparatus to provide an instruction execution environment for execution of instructions of target program code, comprising:
memory access program logic to perform a tag-guarded memory access operation in response to a target address, the tag-guarded memory access operation comprising:
comparing an address tag associated with the target address with a guard tag stored in a memory system in association with a block of one or more memory locations comprising an addressed location identified by the target address; and
generating an indication of whether a match is detected between the guard tag and the address tag; and
tag setting program logic responsive to a multiple guard tag setting instruction of the target program code to trigger at least one memory access to update the guard tags associated with at least two consecutive blocks of one or more memory locations.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
processing circuitry to perform data processing in response to instructions; and
memory access circuitry to perform a tag-guarded memory access operation in response to a target address, the tag-guarded memory access operation comprising:
  comparing an address tag associated with the target address with a guard tag stored in a memory system in association with a block of one or more memory locations comprising an addressed location identified by the target address, wherein the memory system comprises at least one cache for caching data or instructions from main memory; and
  generating an indication of whether a match is detected between the guard tag and the address tag; in which:
  the memory access circuitry is configured to determine, independent of the address tag, which location in the main memory is the addressed location; and
  the memory access circuitry is configured to determine, according to a programmable mapping, a mapping of guard tag storage locations in the main memory for storing guard tags for corresponding blocks of memory locations in the main memory.

2. The apparatus according to claim 1, in which an amount of address space allocated for the guard tag storage locations is variable depending on the programmable mapping.

3. The apparatus according to claim 1, in which the programmable mapping supports at least:
  a first configuration in which a given portion of address space is allocated for the guard tag storage locations; and
  a second configuration in which the given portion of the address space is allocated for blocks of one or more memory locations for storing data or instructions.

4. The apparatus according to claim 1, in which the memory access circuitry is configured to control access to the guard tag storage locations and to other memory locations other than the guard tag storage locations, where a minimum data size for a memory access to the guard tag storage locations is different to a minimum data size for a memory access to the other memory locations.

5. The apparatus according to claim 1, in which the processing circuitry is configured to support a software coherence scheme to maintain coherence of guard tags cached in at least one cache.

6. The apparatus according to claim 1, in which the processing circuitry is configured to support at least one type of tag cache maintenance operation requestable by software to trigger cleaning or invalidation of guard tags cached in at least one cache.

7. The apparatus according to claim 1, comprising hardware coherence management circuitry to support a hardware coherence scheme to maintain coherence of data or guard tags cached in at least one cache.

8. The apparatus according to claim 1, in which the memory access circuitry is configured to determine, according to the programmable mapping, whether a given memory location other than a guard tag storage location is a tagged location associated with a corresponding guard tag storage location or an untagged location not having a corresponding guard tag storage location.

9. The apparatus according to claim 8, in which, in the tag-guarded memory access operation, when the addressed location is determined to be an untagged location, the memory access circuitry is configured to:
  generate an error indication; or
  treat the addressed location as being associated with a guard tag having a default value.

10. The apparatus according to claim 1, in which the programmable mapping provides a variable mapping between an address of a given memory location and an address of a corresponding guard tag storage location for storing the guard tag associated with the given memory location.

11. The apparatus according to claim 1, in which:
  for a first portion of an address space, the programmable mapping is configured according to a first configuration mechanism; and
  for a second portion of the address space, the programmable mapping is configured according to a second configuration mechanism different to the first configuration mechanism.

12. The apparatus according to claim 1, in which:
  for at least one portion of an address space, the memory access circuitry is configured to determine the mapping of guard tag storage locations based on a programmable base address indicative of a start of a guard tag storage region of address space allocated for the guard tag storage locations.

13. The apparatus according to claim 1, in which:
  for at least one portion of an address space, the memory access circuitry is configured to determine the mapping of guard tag storage locations based on a plurality of sets of programmable range configuration information, each set of programmable range configuration information for specifying a range of addresses designated for tagged memory locations and specifying a guard tag storage region of address space designated for the guard tag storage locations associated with the tagged memory locations.

14. The apparatus according to claim 13, in which the memory access circuitry is configured to treat, as an untagged location not having an associated guard tag storage region, a memory location having an address in said at least one portion of the address space that lies outside any valid range defined by the plurality of sets of programmable range configuration information.

15. The apparatus according to claim 1, in which:
  for at least one portion of an address space, the memory access circuitry is configured to determine the mapping of guard tag storage locations in dependence on a hierarchical mapping structure comprising a plurality of levels of mapping table, where the memory access circuitry is configured to identify an address of a guard tag storage location corresponding to a given memory location by performing a table walk through the hierarchical mapping structure based on an address of the given memory location.

16. An apparatus comprising:
  processing circuitry to perform data processing in response to instructions; and
  memory access circuitry to perform a tag-guarded memory access operation in response to a target address, the tag-guarded memory access operation comprising:
    comparing an address tag associated with the target address with a guard tag stored in a memory system in association with a block of one or more memory locations comprising an addressed location identified by the target address; and
    generating an indication of whether a match is detected between the guard tag and the address tag; in which:
  the memory access circuitry is configured to determine, according to a programmable mapping, a mapping of guard tag storage locations for storing guard tags for corresponding blocks of memory locations, in which in response to a non-guard-tag-setting store instruction executed by the processing circuitry, the memory access circuitry is configured to trigger at least one memory access to update data stored in a memory location other than the guard tag storage locations, without updating the guard tag storage locations; and in response to a guard tag setting instruction executed by the processing circuitry, the memory access circuitry is configured to trigger at least one memory access to update at least one guard tag stored in at least one guard tag storage location; and the guard tag setting instruction and the non-guard-tag-setting store instruction are different instructions of an instruction set architecture supported by the processing circuitry.

17. An apparatus comprising:

processing circuitry to perform data processing in response to instructions; and memory access circuitry to perform a tag-guarded memory access operation in response to a target address, the tag-guarded memory access operation comprising:

comparing an address tag associated with the target address with a guard tag stored in a memory system in association with a block of one or more memory locations comprising an addressed location identified by the target address; and generating an indication of whether a match is detected between the guard tag and the address tag; in which:

the memory access circuitry is configured to determine, according to a programmable mapping, a mapping of guard tag storage locations for storing guard tags for corresponding blocks of memory locations;

for at least one portion of an address space, the memory access circuitry is configured to determine the mapping of guard tag storage locations based on tagged/untagged indicators each corresponding to a corresponding region of the at least one portion and indicating whether the corresponding region is a tagged region or an untagged region; and for a given region indicated as a tagged region, the guard tags associated with memory locations with addresses in the given region are stored in guard tag storage locations having addresses in a designated guard tag storage region of the address space corresponding to the given region.

18. The apparatus according to claim 17, in which a mapping between the given region and the designated guard tag storage region is non-programmable.

* * * * *